(12) United States Patent
Campbell

(10) Patent No.: US 7,043,448 B2
(45) Date of Patent: May 9, 2006

(54) ORGANIZING AND MANAGING TRANSACTION-RELATED TAX INFORMATION

(75) Inventor: Harold Campbell, Decatur, GA (US)

(73) Assignee: Accenture LLP, Palo Alto, CA (US)

( * ) Notice: Subject to any disclaimer, the term of this patent is extended or adjusted under 35 U.S.C. 154(b) by 281 days.

(21) Appl. No.: 10/430,691

(22) Filed: May 5, 2003

(65) Prior Publication Data

US 2003/0233297 A1 Dec. 18, 2003

Related U.S. Application Data

(63) Continuation of application No. 09/386,897, filed on Aug. 31, 1999, now abandoned.

(51) Int. Cl.
*G06F 17/60* (2006.01)

(52) U.S. Cl. .......................... 705/31; 705/19
(58) Field of Classification Search ............... 705/31
See application file for complete search history.

(56) References Cited

U.S. PATENT DOCUMENTS

| | | | | | |
|---|---|---|---|---|---|
| 5,138,549 | A | * | 8/1992 | Bern | 705/31 |
| 5,335,169 | A | * | 8/1994 | Chong | 705/31 |
| 5,358,278 | A | * | 10/1994 | Ellis | 281/31 |

(Continued)

FOREIGN PATENT DOCUMENTS

| | | | |
|---|---|---|---|
| JP | 05334326 | * | 12/1993 |
| JP | 09016673 | * | 1/1997 |
| JP | 10275179 | * | 10/1998 |

OTHER PUBLICATIONS

CPA Journal article entitled, "Bringing tax compliance into the information age", Jonathan Light, v71n6, pp 10–11, Jun. 2001.*
"Data Base for Program Desigh", IBM Techinical Disclosure Bulletin, vol. 29, Issue 12, pp. 5434–5435, May 1987.*
Intuit Press Release: "Award–Winning Turbo Tax for Businesses Offers Small Businesses Comprehensive Business–Specific Advise to File Their Taxes", Jan. 1998.*
Intuit Press Release: "Intuit Announces The Internet's Most Complete Online Tax Solution for Consumer", Feb. 1998.*
Intuit Press Release: "New Quicken 2000 for Windows Helps Consumers Make Better Investing Decisions", Aug. 1999.*

(Continued)

*Primary Examiner*—Richard Chilcot
(74) *Attorney, Agent, or Firm*—Oppenheimer Wolff & Donnelly LLP

(57) ABSTRACT

Organizing and managing a transaction-related dimension of tax-related data allows for the generation of fact details to facilitate payment of taxes. First, a transaction-related dimension of tax-related data is provided along with a plurality of attributes for the transaction-related dimension. Such attributes include a transaction line item determined based on a transaction identifier, a transaction type, a tax type, a customer account identifier, a sold to location geographic code, a ship to location geographic code, a contract number, a purchase order number, a vendor account identifier, and a vendor zip code. Next, a plurality of entries are received which are associated with the attributes of the transaction-related dimension. A plurality of fact details are then generated using the entries of a predetermined set of the attributes of the transaction-related dimension. Thereafter, a set of aggregate fact details are generated based on the plurality of fact details. These aggregate fact details are then outputted.

18 Claims, 21 Drawing Sheets

U.S. PATENT DOCUMENTS

| | | | | | |
|---|---|---|---|---|---|
| 5,630,073 | A | * | 5/1997 | Nolan | 705/45 |
| 5,724,523 | A | * | 3/1998 | Longfield | 705/35 |
| 5,772,251 | A | * | 6/1998 | Fleck | 283/115 |
| 5,774,872 | A | * | 6/1998 | Golden et al. | 705/19 |
| 5,781,773 | A | * | 7/1998 | Vanderpool et al. | 707/100 |
| 5,781,911 | A | * | 7/1998 | Young et al. | 707/201 |
| 5,987,429 | A | * | 11/1999 | Maritzen et al. | 705/31 |
| H1830 | H | * | 1/2000 | Petrimoulx et al. | 705/31 |
| 6,064,983 | A | * | 5/2000 | Koehler | 705/31 |
| 6,078,898 | A | * | 6/2000 | Davis et al. | 705/19 |
| 6,078,899 | A | * | 6/2000 | Francisco et al. | 705/19 |
| 6,144,964 | A | * | 11/2000 | Breese et al. | 707/10 |

OTHER PUBLICATIONS

Intuit Press Release: "Quicken 98 Arrives in Stores Tomorrow", Oct. 1997.*

Intuit Press Release: "Turbo Tax Customers Now Can Electronically File and Pay Their IRS Balance Due, In One Easy Step, Using A Novus Card", Aug. 1998.*

Maria Langer, Quicken 2000 The Official Guide, 1999, pp 153-179.*

Microsoft Corporation, The Money 98 Companion Strategies for Success, 1997, pp 1-53.*

* cited by examiner

US 7,043,448 B2

ORGANIZING AND MANAGING TRANSACTION-RELATED TAX INFORMATION

This application is a continuation of Ser. No. 09/386,897 filed Aug. 31, 1999, abandoned.

FIELD OF INVENTION

The present invention relates to tax-related software and more particularly to managing and organizing tax-related details in a database for effective input and retrieval.

BACKGROUND OF INVENTION

Numerous systems have been developed to automate financial record keeping for the purpose of tracking expense related items, income, assets, and/or liabilities, for budgetary or tax purposes. Nevertheless, although attractive in theory, most conventional systems are impractical for effective use. In most cases, one cannot afford to hire a bookkeeper to gather the necessary data, and even though a number of commercial accounting programs are available which can be run by an individual with no special training on a personal home computer, most individuals do not have the time or desire to run such programs, which inevitably require the individual to manually enter the necessary data into the computer each time a transaction, i.e., the writing of a check or deposit slip, is carried out, or to scan prerecorded forms, which must be specially prepared and compared with the original checks or deposit slips to ensure accuracy.

Numerous entities have finances which would benefit from automation, especially for budget planning or tax purposes, but the automation is useless if it requires generation of additional forms, manual verification and/or manual data entry. The simplest investments, such as a rental property or the purchase of ordinary common stocks, can generate an overwhelming amount of transaction data. Nevertheless, even the most user-friendly home accounting and tax preparation programs tend to end up on the shelf when the user discovers the effort needed to enter transaction data every time a cancelled check is returned or a deposit is made. Even where the bank makes available electronic or optically scannable records which can be entered in the home accounting program, the time necessary to verify the data often negates the time saved by automated entry. Despite the best of intentions, the cancelled checks and other documents concerning the transaction thus often end up in a "shoe box" until they are needed, for example, for taxes, or for an unforeseen crisis such as a divorce or bankruptcy, by which time the individual's records can at best be only partially reconstructed and at great difficulty. While such a possibility should motivate individuals to keep better records, especially in view of the currently available technology for that purpose, it simply does not.

SUMMARY OF INVENTION

A system, method, and article of manufacture are provided for organizing an transaction-related dimension of tax-related data for generating fact details to facilitate payment of taxes. First, an transaction-related dimension of tax-related data is provided along with a plurality of attributes for the transaction-related dimension. Such attributes include a transaction line item determined based on a transaction identifier, a transaction type, a tax type, a customer account identifier, a sold to location geographic code, a ship to location geographic code, a contract number, a purchase order number, a vendor account identifier, and a vendor zip code. Next, a plurality of entries are received which are associated with the attributes of the transaction-related dimension. A plurality of fact details are then generated using the entries of a predetermined set of the attributes of the transaction-related dimension. Thereafter, the fact details are outputted.

In one aspect of the present invention, the transaction line item is further determined based on a transaction description and a contract type.

In another aspect of the present invention, the dimensions may include asset, date, entity, jurisdiction, tax classification, and/or transaction dimensions. Further, the fact details may include an adjusted book fact, a tax adjustment fact, a schedule M fact, a tax return fact, an apportionment fact, a line item fact, a transaction fact, an invoice fact, an asset fact, a payroll fact, a taxes paid fact, and/or a projected financial fact.

BRIEF DESCRIPTION OF DRAWINGS

The invention will be better understood when consideration is given to the following detailed description thereof. Such description makes reference to the annexed drawings wherein.

DISCLOSURE OF INVENTION

The present invention is provided for organizing multiple dimensions of tax-related data for generating fact details to facilitate payment of taxes. In order to accomplish this, one embodiment of the present invention is practiced in the context of a personal computer such as an IBM compatible personal computer, Apple Macintosh computer or UNIX based workstation.

Figure 1:
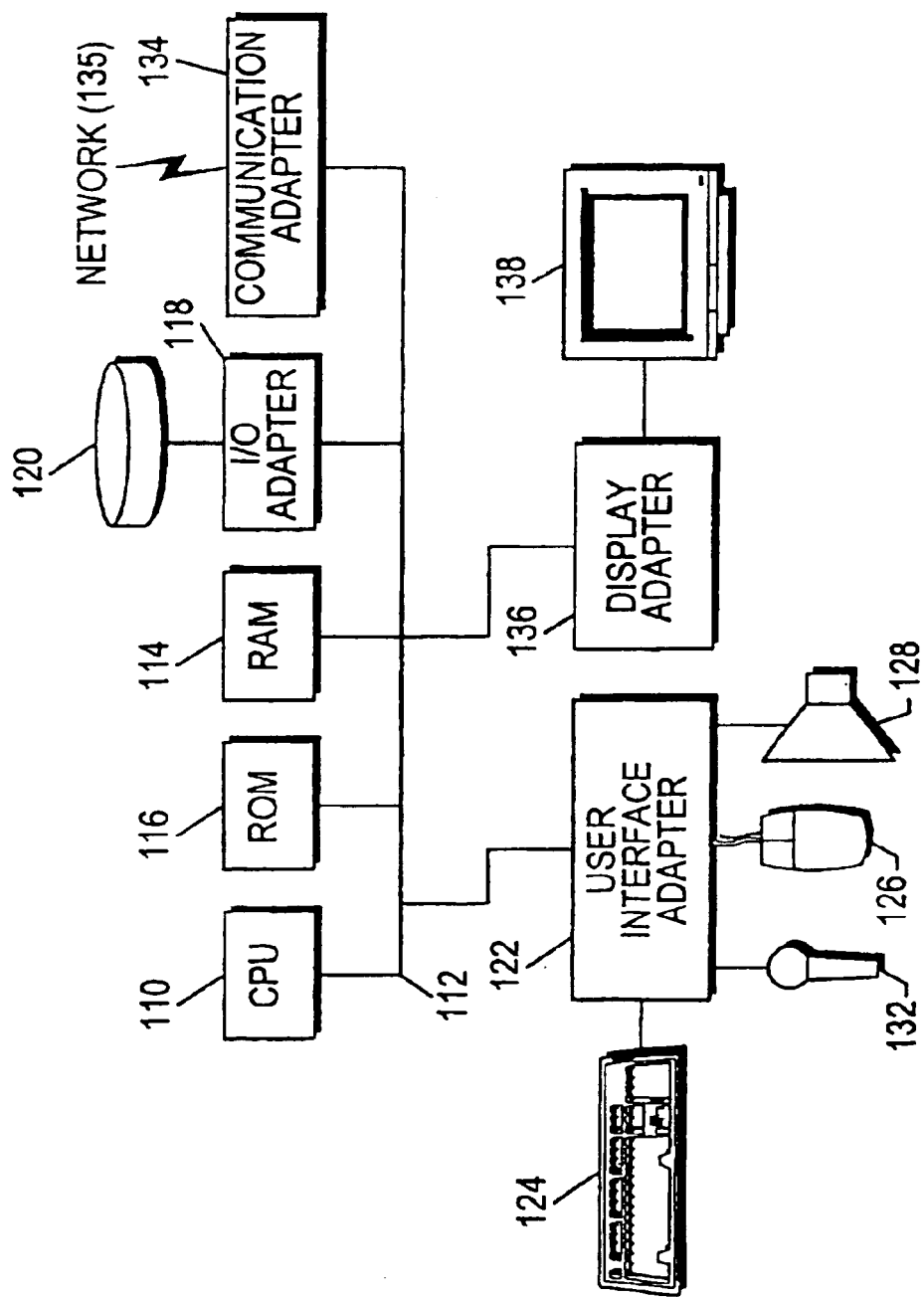
FIG. 1 is a schematic diagram of a hardware implementation of one embodiment of the present invention.

A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Operating on the hardware is software. One embodiment of software is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 1A:
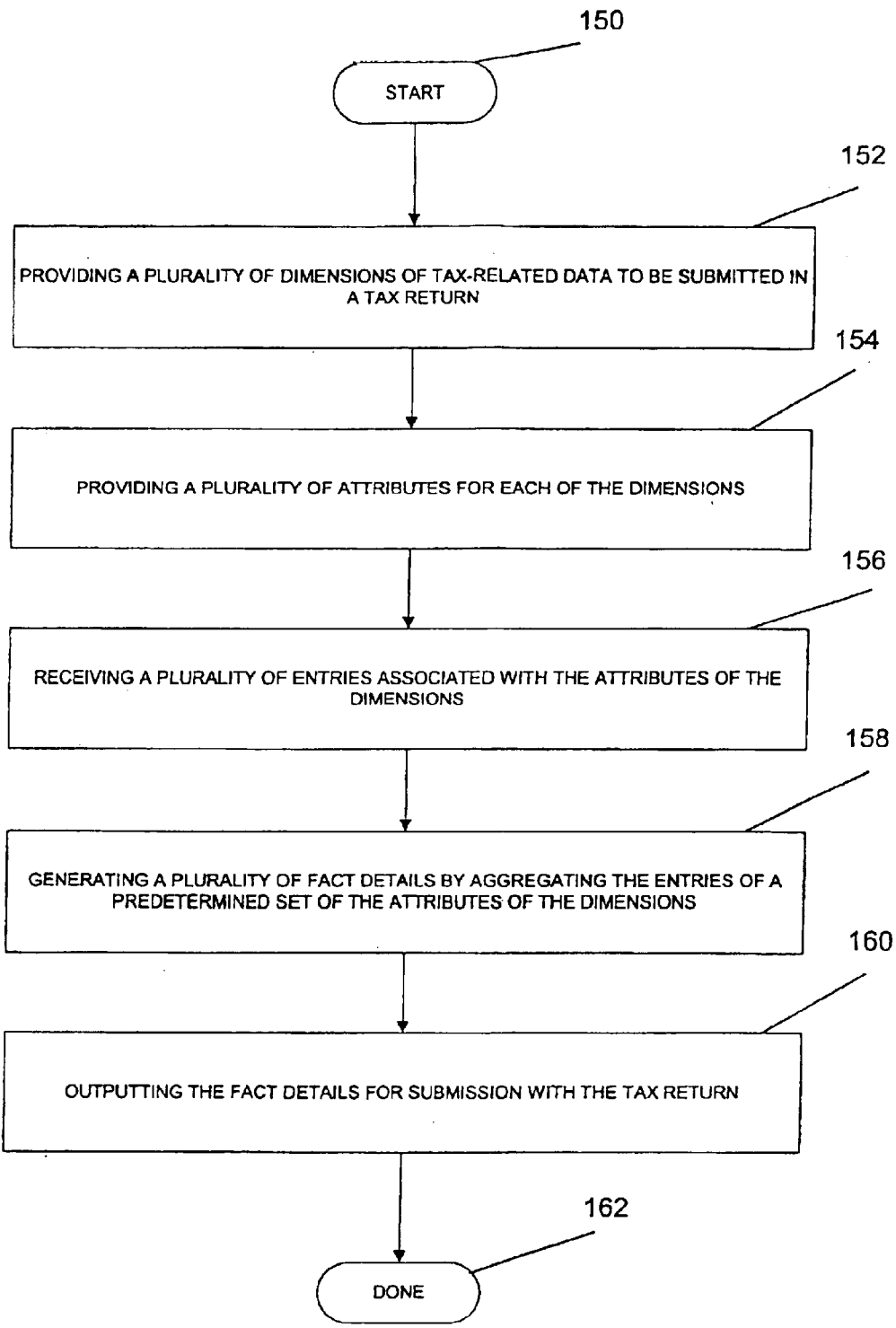
FIG. 1a is a flowchart depicting the various steps of one embodiment of the present invention.

FIG. 1A is a flowchart illustrating the various operations of the present invention that may be carried out by the hardware and software tools set forth hereinabove. In the most general terms, the process begins in operation 150. Next, a plurality of dimensions of tax-related data to be submitted in a tax return are provided along with a plurality of attributes for each of the dimensions. See operation 152 and 154, respectively. The dimensions include information pertinent to the calculation of tax liability. Such information includes tax classification and entity type. This information may be further classified in the various attributes of the dimensions.

With continuing reference to FIG. 1A, and in particular operation 156, a plurality of entries are shown to be received which are associated with the attributes of the dimensions. A plurality of fact details are then generated by aggregating the entries of a predetermined set of the attributes of some or all of the dimensions, as indicated in operation 158. Thereafter, in operation 160 the fact details are outputted for various reason such as submission with the tax return after which the process is terminated in operation 162.

It should be noted that the dimensions, attributes, and entries may be inputted by any input device such as the keyboard 124, the mouse 126, the microphone 132, the touch screen (not shown), or anything else that is capable of conveying such information. As an option, the dimensions attributes need only be entered initially once, or simply provided.

Further, the generation of the fact details may be carried out via the CPU 110 which in turn may be governed by a computer program stored on a computer readable medium, i.e. the RAM 114, ROM 116, the disk storage units 120, and/or anything else capable of storing the computer program. In the alternative, dedicated hardware such as an application specific integrated circuit (ASIC) may be employed to accomplish the same.

In order to generate the fact details, a computer program, or any other type of logic, is adapted to use different sets of the attributes of some or all of the dimensions for calculation of each of the various fact details. Upon the appropriate selection of attributes that are applicable to the calculation of the fact detail at hand, the fact detail may be calculated using equations and rules set forth by the desired tax preparation practice. In the alternative, such calculation of the fact details may be carried out manually, thereby using the present invention primarily for the collection, organization, and convenient access to the tax-related data.

The outputting of the fact details may be effected by way of the display 138, the speaker 128, a printer (not shown) or any other output mechanism capable of delivering the results to the user. It should be understood that the foregoing components need not be resident on a single computer, but also may be a component of either a networked client and/or a server.

In use, the system may be capable of supporting data requirements for federal and state income tax filing; supporting the analysis of foreign sale corporation activity on a transaction-by-transaction basis, storing and retrieving transaction data to support federal income tax information document requests, analyzing sales and using tax refund opportunities, comparing specific valuation bases for property tax reporting, supplying financial data on a jurisdictional basis to support state and local credit and incentives analysis, and storing and retrieving data related to income projection and schedule M reversals to support deferred planning. The present invention may thus include an API which can handle any tax-related matter including those listed above, and may further be capable of allowing convenient retrieval and input of tax-related fact details through an automated organization method which will soon be set forth.

In one embodiment of the present invention, a description may be provided for each of the attributes, dimensions, and fact details. Such description may facilitate the inputting of the entries or serve to explain the generated fact details.

Dimensions & Attributes

Figure 2:
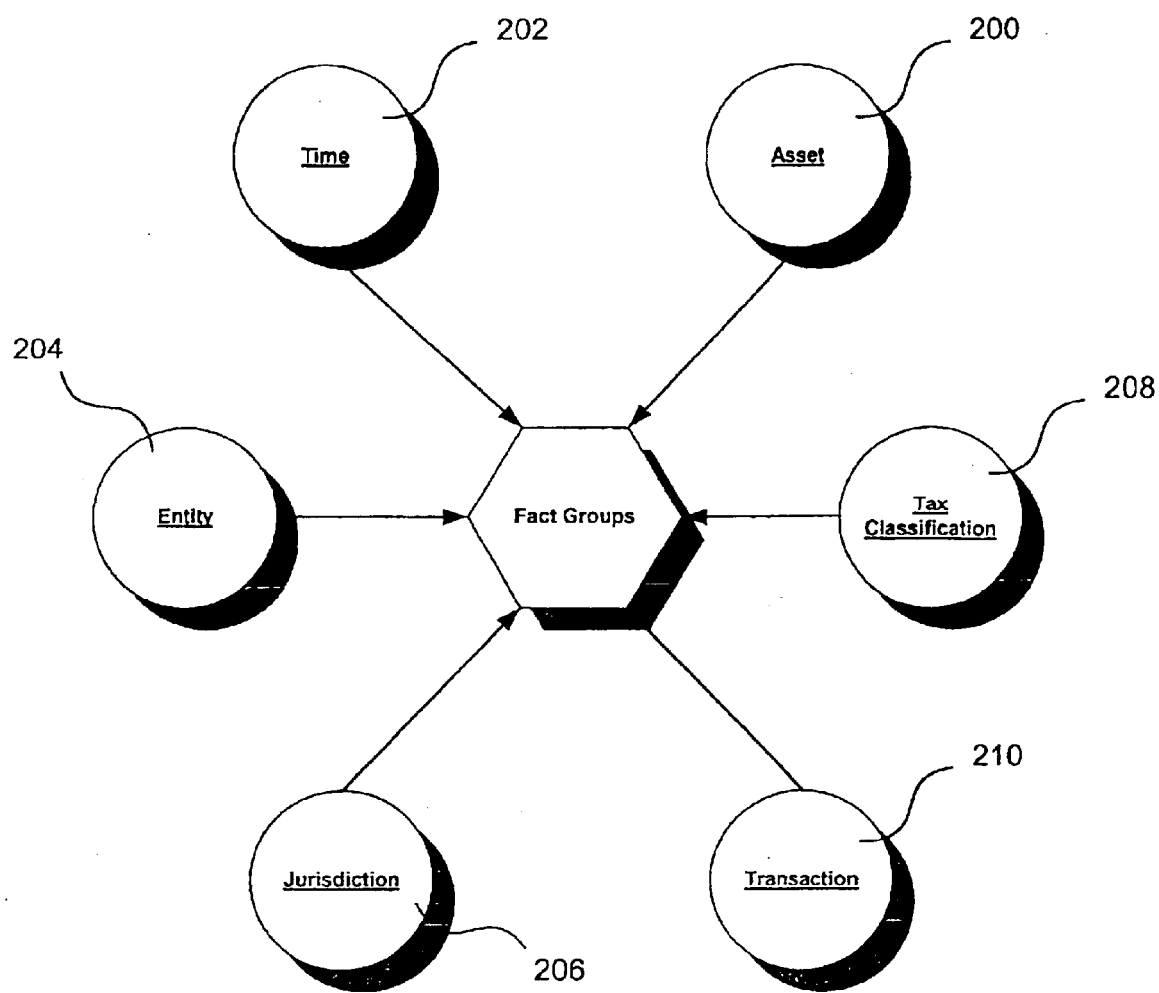
FIG. 2 is an illustration showing various dimensions of tax-related data which together comprise a plurality of fact groups in accordance with one embodiment of the present invention.

In one embodiment of the present invention, the dimensions may include asset 200, date 202, entity 204, jurisdiction 206, tax classification 208, and/or transaction 210 dimensions. Note FIG. 2 as well as the following table, which lists and describes each of the dimensions found in FIG. 2 and used for generation of fact details.

| Dimension Name | Dimension Description |
|---|---|
| Asset | Contains all of the attributes associated with an asset. |

-continued

| Dimension Name | Dimension Description |
|---|---|
| Date | Contains attributes about the time when an activity occurred. |
| Entity | Contains all the attributes associated with a legal entity. |
| Jurisdiction | Contains all the attributes of the taxing jurisdiction. |
| Tax Classification | Represents the categories by which information is reported on various returns. |
| Transaction | Contains all the attributes of all source systems from which information was imported. |

Figure 3:
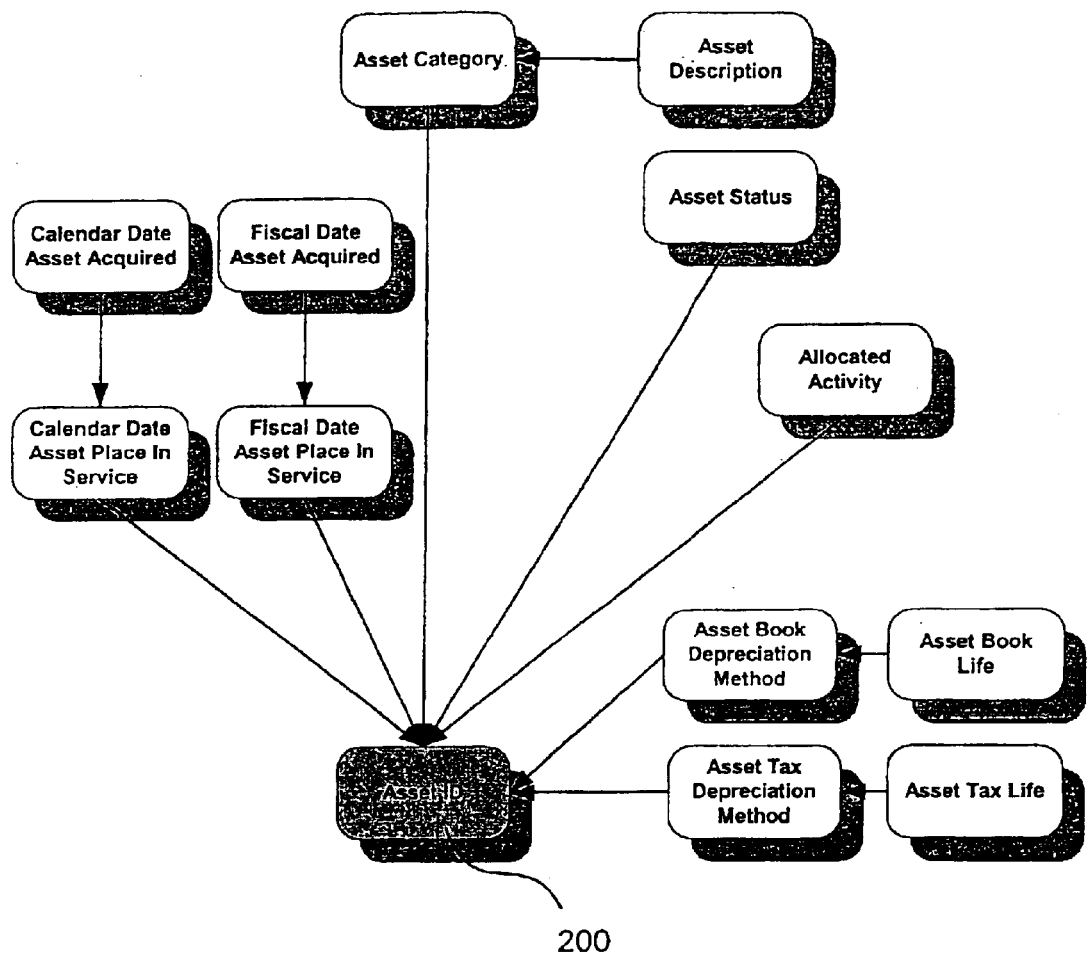
FIG. 3 is an illustration showing various examples of attributes associated with the asset dimension in accordance with one embodiment of the present invention.

Various attributes of the asset dimension 200 of the tax-related data are shown in FIG. 3. The following table lists each attribute of the asset dimension 200 shown in FIG. 3 and its exemplary description. Also included are sample entries that are used for, for example, calculating fact details and tax cost or identifying a particular asset.

| Attribute Name | Attribute Description | Sample Values |
|---|---|---|
| Asset ID | Represents a unique identifier assigned to individual assets in the property subsystem. | 1234 |
| Asset Category | Represents the category of assets in the property subsystem. | Vehicles |
| Asset Description | Represents more detail on individual asset in the property subsystem. | 1997 Chevy Truck |
| Asset Status | Identifies the condition of each asset. | New, used, obsolete |
| Calendar Date Asset Placed In Service | Identifies the date an individual asset was placed in service | Jan. 1, 1999 |
| Calendar Date Acquired | Identifies the date an individual asset was acquired | Jan. 1, 1999 |
| Fiscal Date Asset Placed In Service | Identifies the fiscal date an individual asset was placed in service | F Jan. 1, 1999 |
| Fiscal Date Acquired | Identifies the fiscal date an individual asset was acquired | F Jan. 1, 1999 |
| Book Life | Identifies the number of years the individual asset is depreciated for financial purposes. | 7 years |
| Book Depreciation Method | Identifies the method used to depreciate the individual asset for financial purposes. | Straight-line |
| Tax Life | Identifies the number of years the individual asset is depreciated for tax purposes. | 3 years |
| Tax Depreciation Method | Identifies the method used to depreciate the individual asset for tax purposes. | Modified Accelerated Cost Recovery System (MACRS) |
| Allocated Activity | Represents the method used to track activity/usage on asset. | Miles per vehicle per state, days in state |

Figure 4:
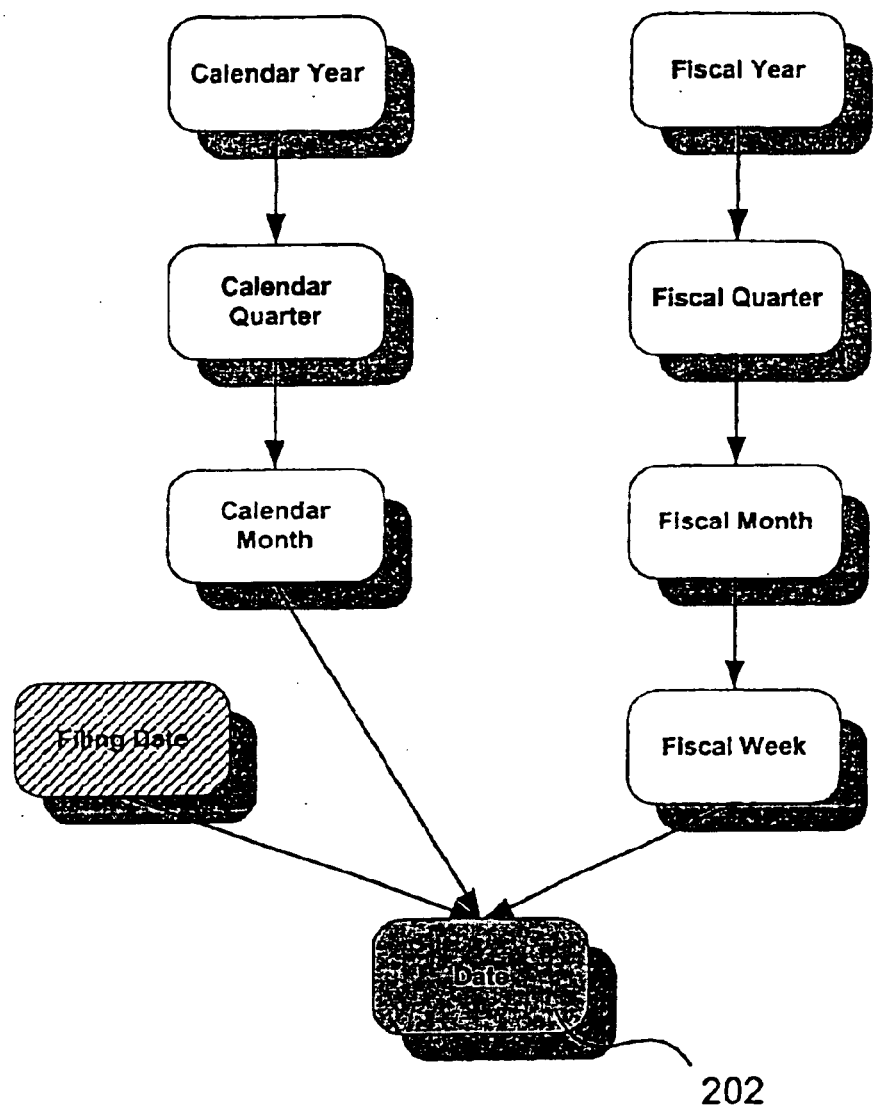
FIG. 4 is an illustration showing various examples of attributes associated with the date dimension in accordance with one embodiment of the present invention.

Various attributes of the date dimension 202 of the tax-related data are shown in FIG. 4 and further characterized as follows (*shaded areas show future attributes):

| Attribute Name | Attribute Description | Sample Values |
|---|---|---|
| Date | The specific day that a transaction/activity took place | 2/28/1998 |
| Calendar Week | The calendar week. | Week 1 1999 |
| Calendar Month | The calendar month. | January, 1998 |
| Calendar Quarter | The calendar quarter. | 1998Q1 |
| Calendar Year | The calendar year. | 1998 |
| Fiscal Week | The week that represents the corporate calendar. Note that the F in the data value indicates that this is a fiscal time period. | F Week 1 1999 F Week 46 1999 |
| Fiscal Month | The fiscal period comprised of 4 or 5 weeks. Note that the F in the data value indicates that this is a fiscal time period. | F January, 1998 |
| Fiscal Quarter | The grouping of 3 fiscal months. | F 1998Q1 |
| Fiscal Year | The grouping of 52 fiscal weeks/ 12 fiscal months that comprise the financial year. | F 1998 |
| Filing Date | The actual date the return was filed. | 5/15/1998 |

Figure 5:
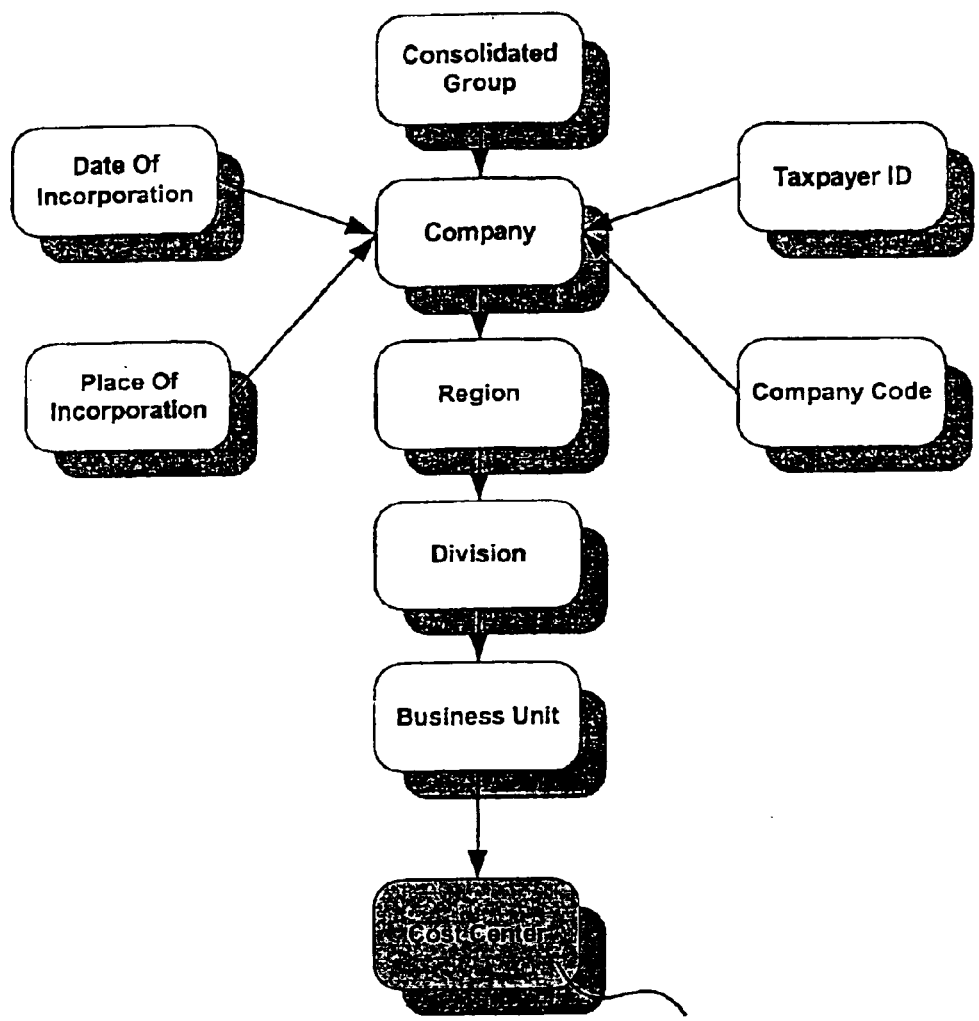
FIG. 5 is an illustration showing various examples of attributes associated with the entity dimension in accordance with one embodiment of the present invention.

Various attributes of the entity dimension 204 of the tax-related data are shown in FIG. 5 and further characterized as follows:

| Attribute Name | Attribute Description | Sample Values |
|---|---|---|
| Cost Center | Indicates a specific cost center that has a budget. This is the lowest level of the corporate organizational structure. | Sales |
| Consolidated Group | Represents the companies, which are grouped together for reporting purposes. | North America |
| Company | Represents the different companies as separate legal entities. | XYZ, Inc. |
| Company code | Represents the company's unique internal numeric identifier. | ABC12345 |
| Taxpayer ID | Represents the legal entity's unique 9 digit tax identification #. | 74-1751406 |
| Date of incorporation | Represents the legal entity's date of incorporation. | Jan. 1, 1998 |
| Place of incorporation | Represents where legal entity was incorporated. | Texas |
| Division | Major operating areas of the company. | Commercial Services |
| Region | Business units that are grouped geographically for field organization and home office by functional area. | Midwest |
| Business Unit | A grouping of cost centers. | Greater Chicago |

Figure 6:
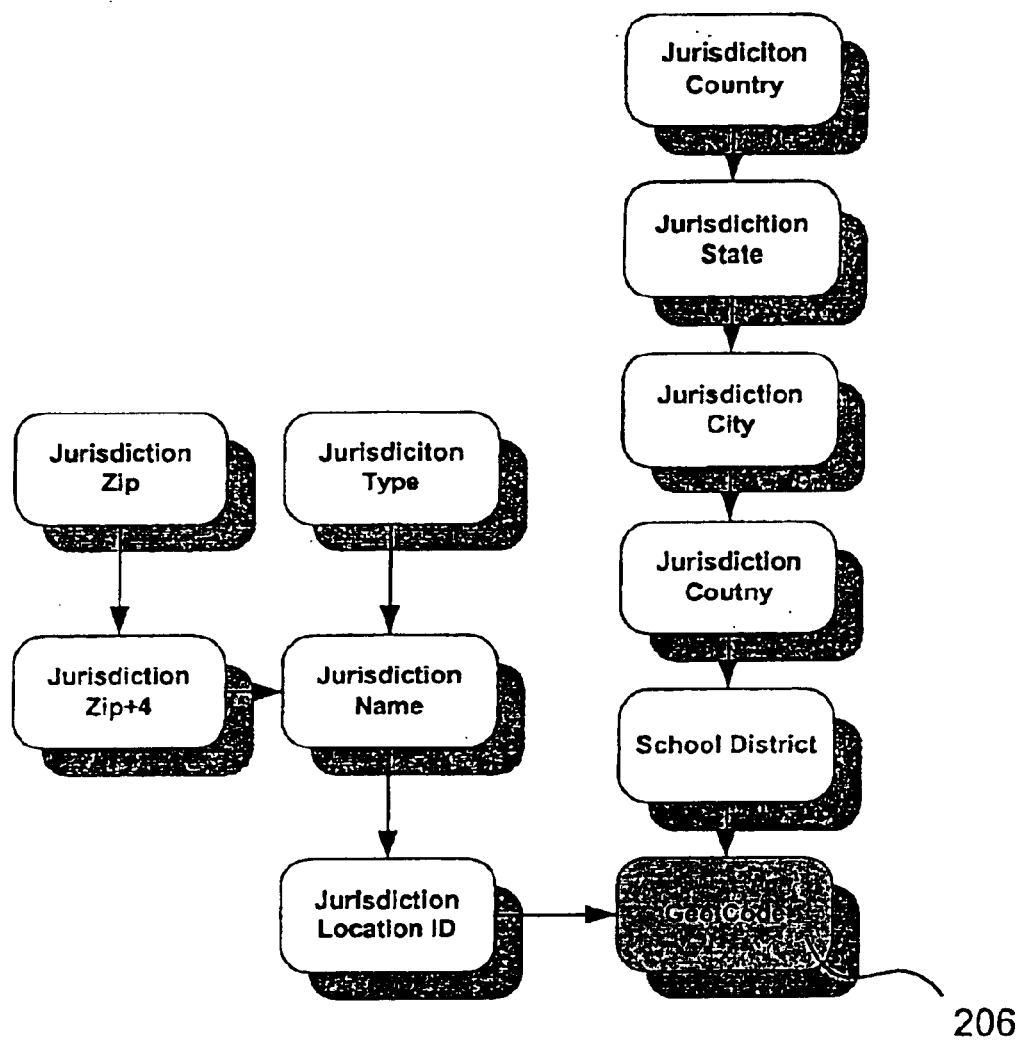
FIG. 6 is an illustration showing various examples of attributes associated with the jurisdiction dimension in accordance with one embodiment of the present invention.

Various attributes of the jurisdiction dimension 206 of the tax-related data are shown in FIG. 6 and further characterized as follows:

| Attribute Name | Attribute Description | Sample Values |
|---|---|---|
| Name | Represents the name of the taxing authority. | City of Houston |
| Jurisdiction type | Represents the type of taxing authority. | Property, sales, etc. |

-continued

| Attribute Name | Attribute Description | Sample Values |
| --- | --- | --- |
| Location ID | Represents a unique identifier to distinguish location at a level below address. | Subdivide sections of a plant or facility-manufacturing, administrative |
| Geo code | Represents a unique identifier similar to zip code. | 77777-12345678 |
| School District | Represents the name of the school district/tax collector the Geo code area is responsible for remitting taxes to. | Houston I.S.D |
| City | Represents the name of the city where Geo code area is located. | Houston |
| County | Represents the name of the county where Geo code area is located. | Harris |
| State | Represents the name of the state where Geo code area is located. | Texas |
| Zip code | The 5 digit zip code where Geo code area is located. | 77042 |
| Zip code + 4 | The 9 digit zip code where Geo code area is located. | 77042-1041 |
| Country | Represents the name of the country where Geo code area is located. | USA |

Figure 7:
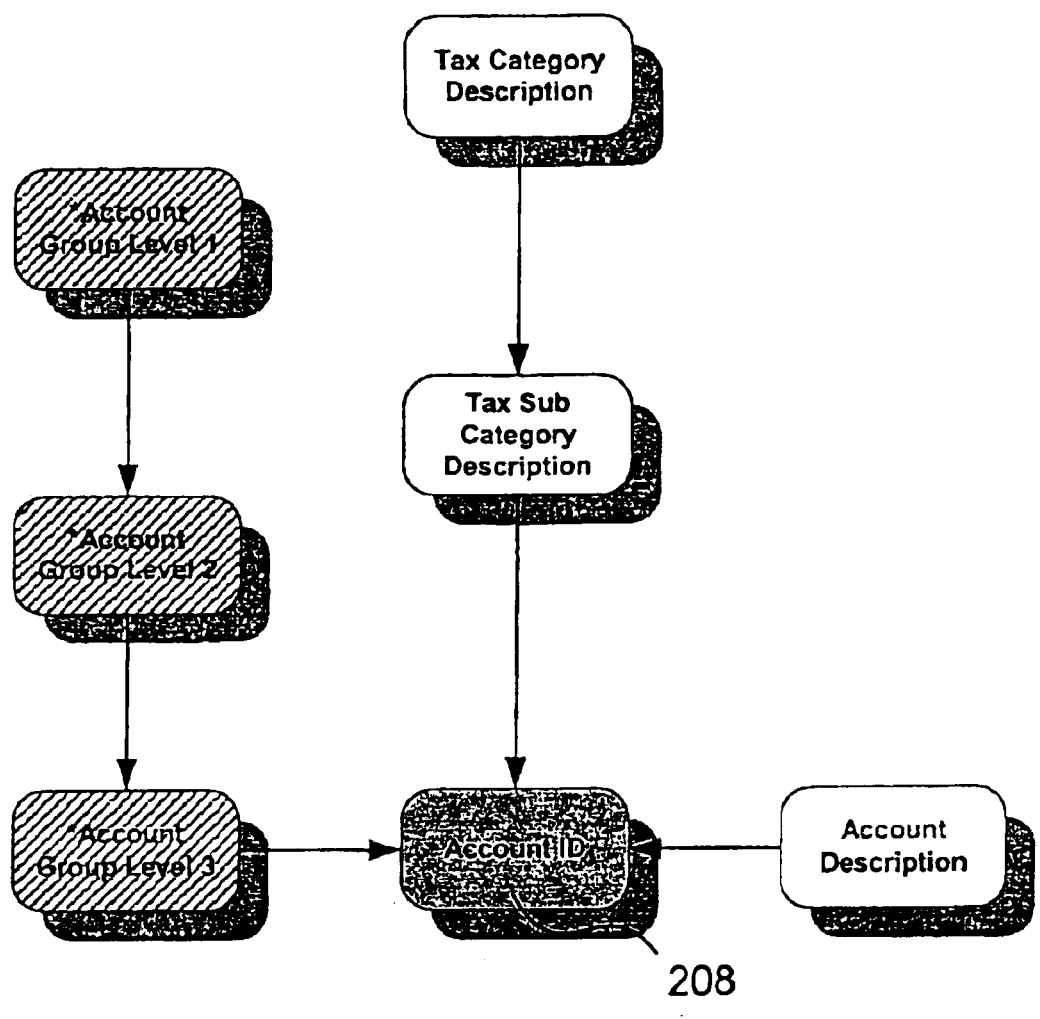
FIG. 7 is an illustration showing various examples of attributes associated with the tax classification dimension in accordance with one embodiment of the present invention.

Various attributes of the tax classification dimension 208 of the tax-related data are shown in FIG. 7 and further characterized as follows:

| Attribute Name | Attribute Description | Sample Values |
| --- | --- | --- |
| Tax Category Description | Represents the type of information reported on the return. (This attribute is meant to capture information by section on the tax form.) | Income, Expense, Tax, Credits, Assets |
| Tax Sub-Category Description | Represents the type of information reported on the return. (This attribute is meant to capture information by line item on the tax form.) | Sales, Cash |
| Account ID | Represents the GL or other account identifier. These accounts are summarized into sub-categories. | 1234 |
| Account Description | Represents the GL or other account description. | Cash-Bank One #1234 |
| Account Group Level 3 | A collection of GL Accounts as determined by finance | Employee Salary, Contract Labor |
| Account Group Level 2 | A collection of Account Group Level 3 accounts as defined by finance | Human Resources |
| Account Group Level 1 | A collection of Account Group Level 2 accounts as defined by finance | Legal Fees, Capital Equipment, Salary & Benefits |

Figure 8:
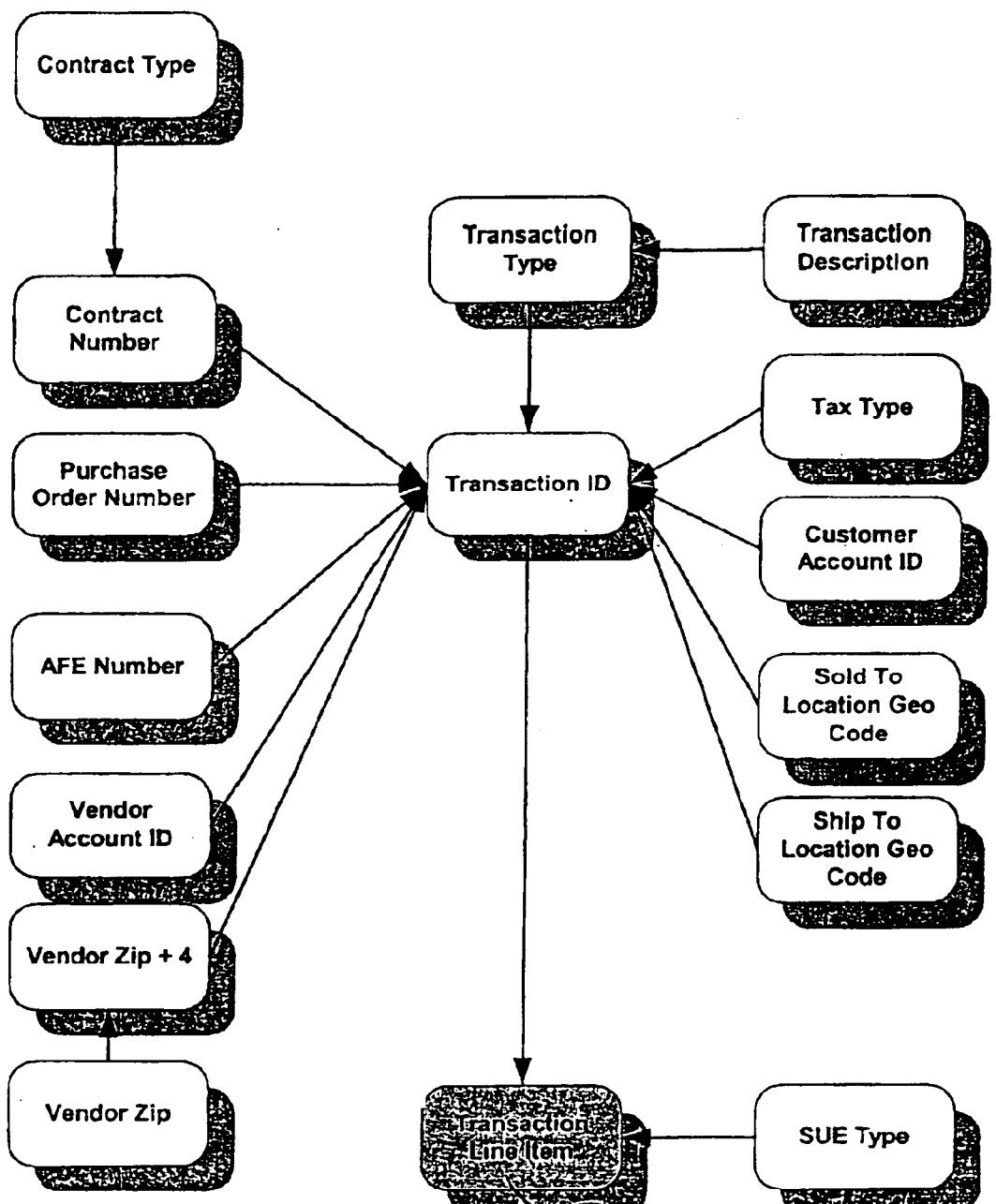
FIG. 8 is an illustration showing various examples of attributes associated with the transaction dimension in accordance with one embodiment of the present invention.

Various attributes of the transaction dimension 210 of the tax-related data are shown in FIG. 8 and further characterized as follows:

| Attribute Name | Attribute Description | Sample Values |
| --- | --- | --- |
| Transaction ID | Identifies the document posting # in the source system. | Invoice #, Check #, Journal Entry #, Batch Posting # |
| Transaction Type | Identifies the document posting type in the source system. | Accruals, Sales, Payments |
| Transaction Description | Represents the text descriptive field for the document posting. | "To accrue Texas Franchise tax for the month of December 1998." |
| Purchase Order Number | Identifies the document posting purchase order inforniation, if applicable. | 1234 |
| AFE Number | Identifies the document posting project number information, if applicable. | 1234 |
| SUE Type | Describes the transaction in terms to identify the taxability of the transaction. (Needed for RAM) | Maintenance, Equipment rentals, new construction, etc. |
| Tax Type | Identifies the type of tax accrued/paid. | sales, use, excise, property, fed income, state income, etc. |
| Customer Account ID | Identifies the customer (referenced in the document posting) who products/services were sold to. | XYZ, Inc. |
| Vendor Account ID | Identifies the vendor or payee (referenced in the document posting who payments for products/services/taxes were made to. | ABC, Inc. |
| Contract Number | Identifies the legal file reference # | 1234 |
| Contract Type | Identifies the type of contract for tax purposes. | Lump sum, separated |
| Sold To Location Geo Code | Identifies the location of where sale/purchase originated. | 77042-1041 |
| Ship To Location Geo Code | Identifies the location of where sale/purchase was shipped/consumed. | 78645-1001 |
| Line Item | Identifies the detail at a level below the total transaction or invoice. | Product, freight costs, account distribution |

Fact Details

In one embodiment of the present invention, the fact details may include an adjusted book fact, a tax adjustment fact, a schedule M fact, a tax return fact, an apportionment fact, a line item fact, a transaction fact, an invoice fact, an asset fact, a payroll fact, a taxes paid fact, and/or a projected financial fact.

Figure 9:
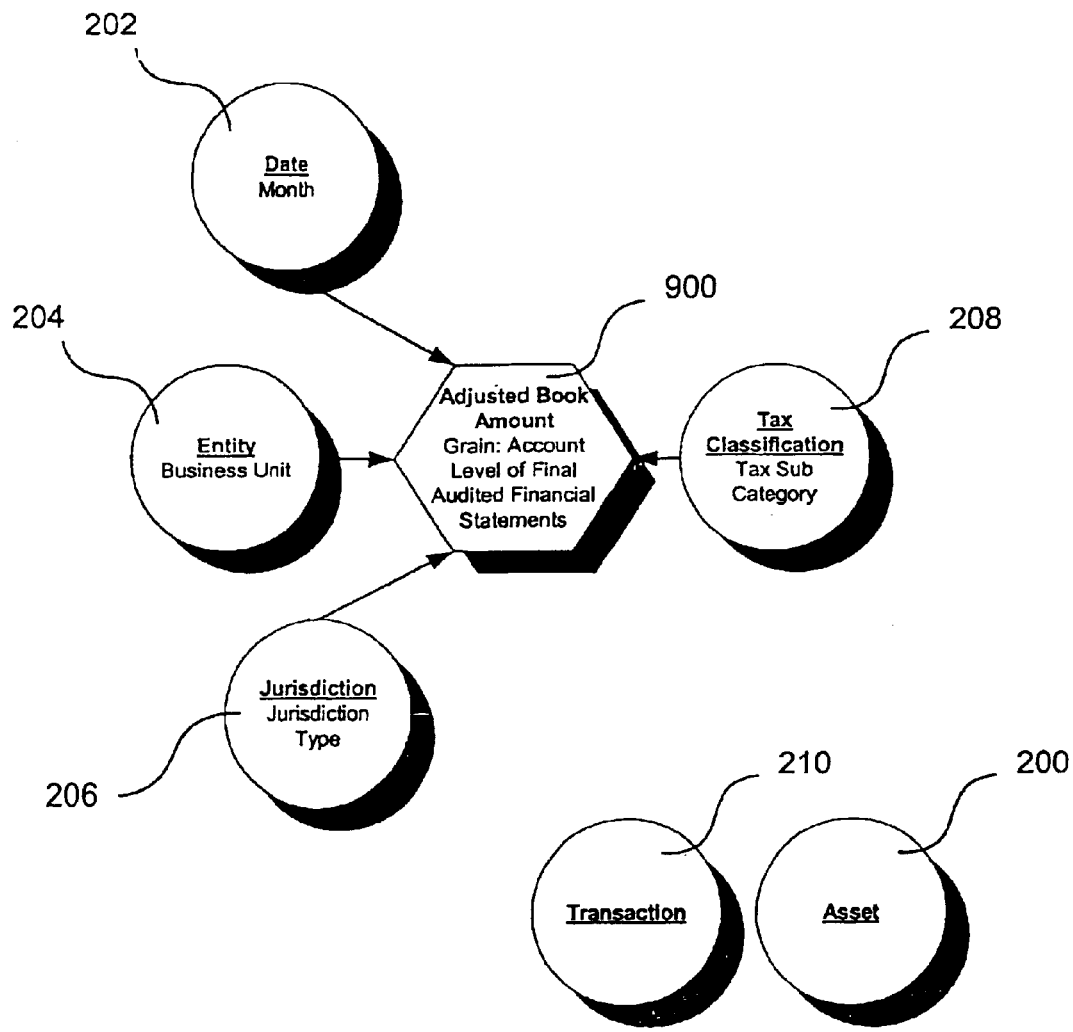
FIG. 9 is an illustration showing a set of the attributes associated with the adjusted book fact in accordance with one embodiment of the present invention.

An example of calculation of an adjusted book fact 900 is shown in FIG. 9. The dimensions necessary for the exemplary calculation of an adjusted book amount, such as of the level of an account, are shown along with a selected attribute that define the parameters of the final calculated fact. In this example, the month attribute of the date dimension is used, meaning that the level of the account at the end of the month is being calculated. The type of entity is classified under the business unit attribute of the entity dimension. Also, the proper jurisdiction type attribute, such as property, sales, or income tax, is selected along with the jurisdiction of the taxing authority, i.e., state, federal, foreign, or special, are selected from the of the jurisdiction dimension. A particular tax sub category of the tax classification dimension is used to identify the type of information that will be reported on the return, such as for capturing information by line item on the tax form. Examples of the tax sub category for the account in this example include sales and cash. Also, as noted in FIG. 9, the transaction and asset dimensions are not used to calculate the adjusted book fact in this example.

The following table illustrates the fact name shown in FIG. 9 as well as describes the fact and provides a default aggregation rule:

| Fact Name | Fact Description | Default Aggregation Rule |
|---|---|---|
| Adjusted Book Amount | The dollar amount per category, subcategory, down to the account level of the final audited (adjusted book) financial statements | Business Unit |

Figure 10:
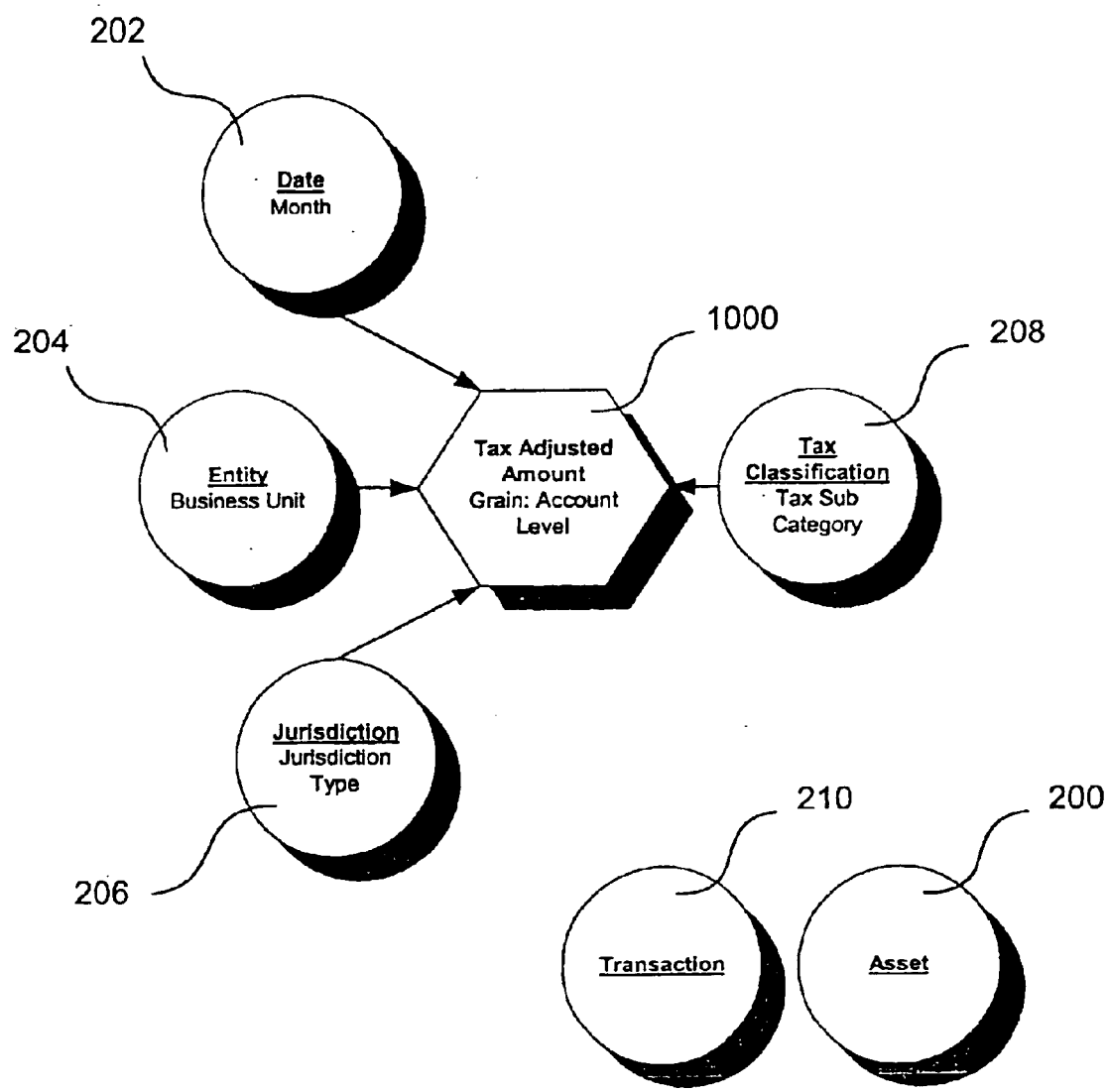
FIG. 10 is an illustration showing a set of the attributes associated with the tax adjustment fact in accordance with one embodiment of the present invention.

Examples of the tax adjustment facts 1000 and associated exemplary descriptions are shown in FIG. 10 and further characterized as follows:

| Fact Name | Fact Description | Default Aggregation Rule |
|---|---|---|
| Tax Adjustment Amount | The dollar amount per category, subcategory, down to the account level of the tax reclassifications to the adjusted book $ for tax purposes. | Business Unit |

Figure 11:
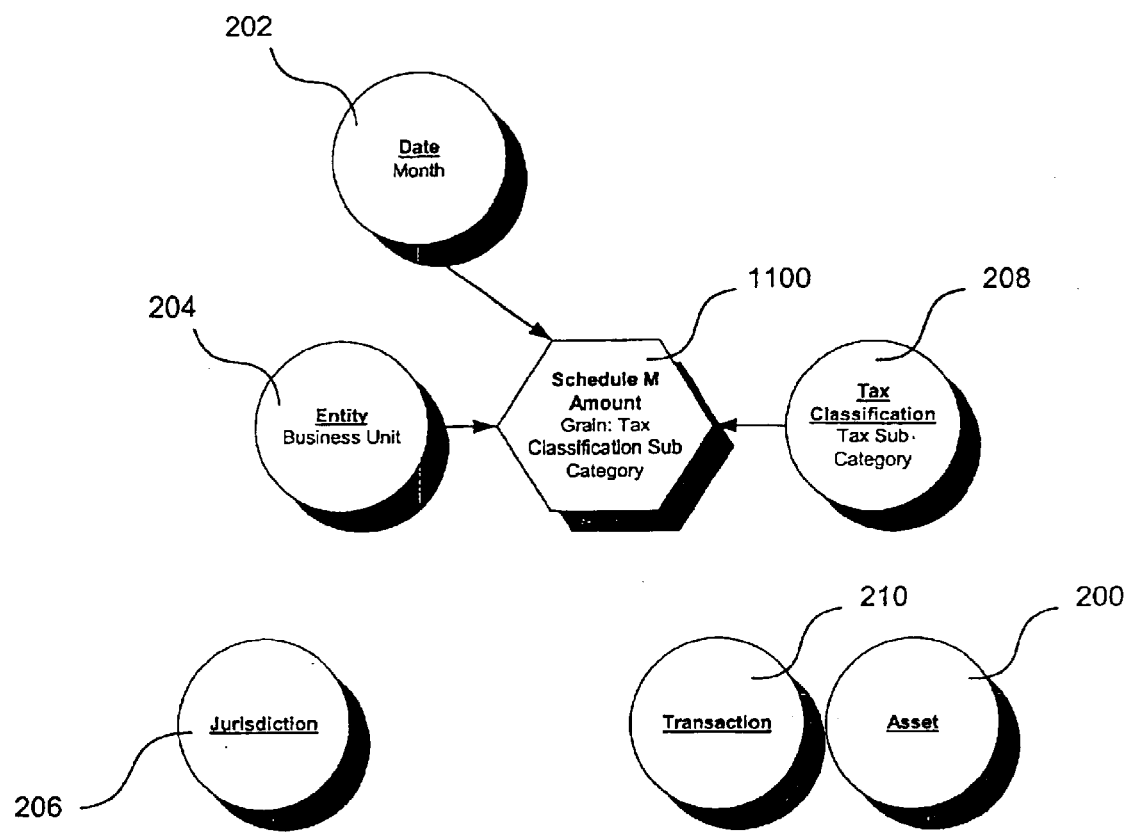
FIG. 11 is an illustration showing a set of the attributes associated with the schedule M fact in accordance with one embodiment of the present invention.

Examples of the schedule M facts 1100 and associated exemplary descriptions are shown in FIG. 11 and further characterized as follows:

| Fact Name | Fact Description | Default Aggregation Rule |
|---|---|---|
| Schedule M Amount | The current years "Schedule M" book to tax reconciling items- examples include the 50% nondeductible portion of travel & entertainment expenses, tax exempt interest income, etc. | Business Unit |

Figure 12:
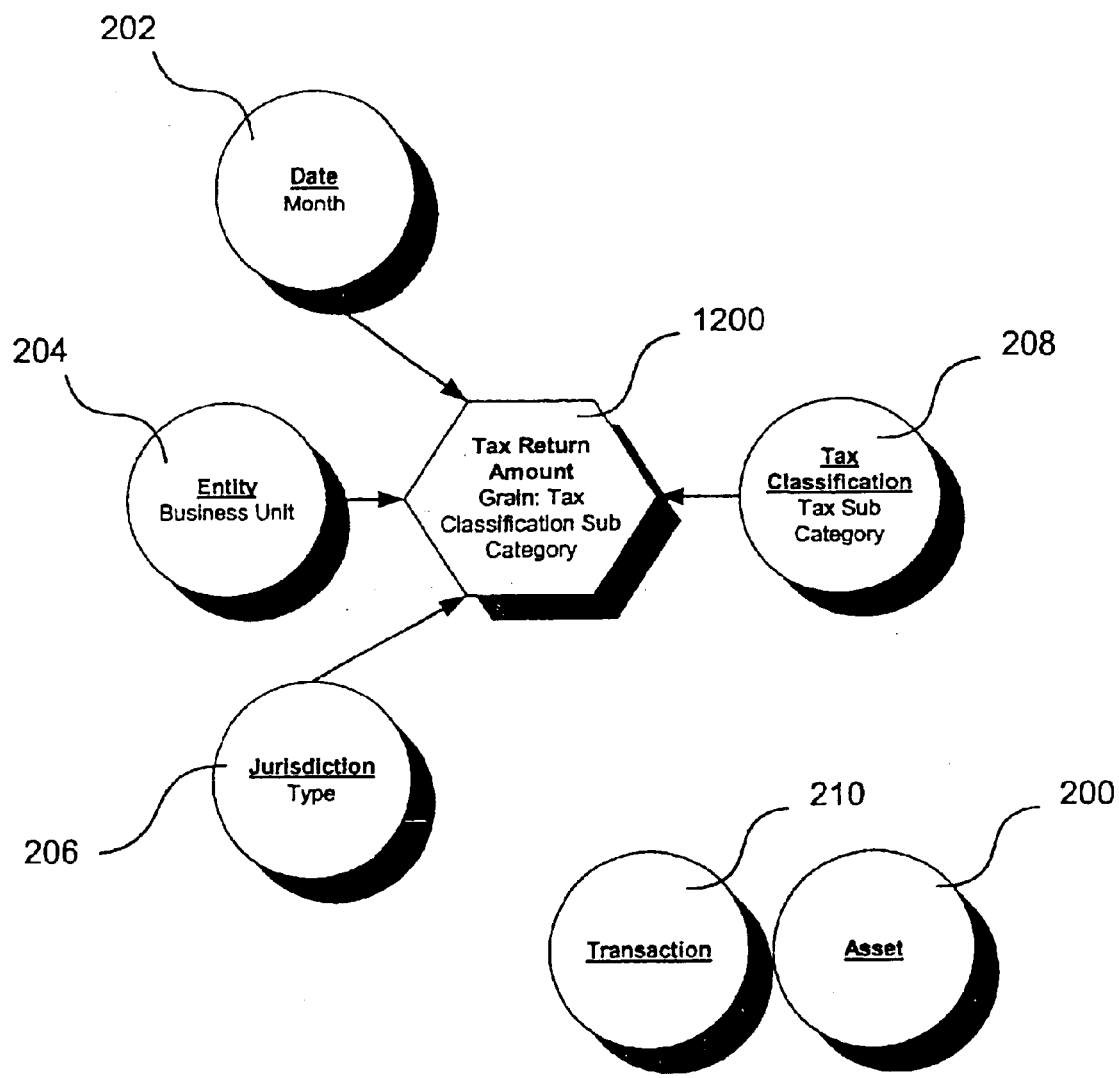
FIG. 12 is an illustration showing a set of the attributes associated with the tax return fact in accordance with one embodiment of the present invention.

Examples of the tax return facts 1200 and associated exemplary descriptions are shown in FIG. 12 and further characterized as follows:

| Fact Name | Fact Description | Default Aggregation Rule |
|---|---|---|
| Tax Return Amount | The dollar amount per category and subcategory of the items per the tax return. | Return Level |

Figure 13:
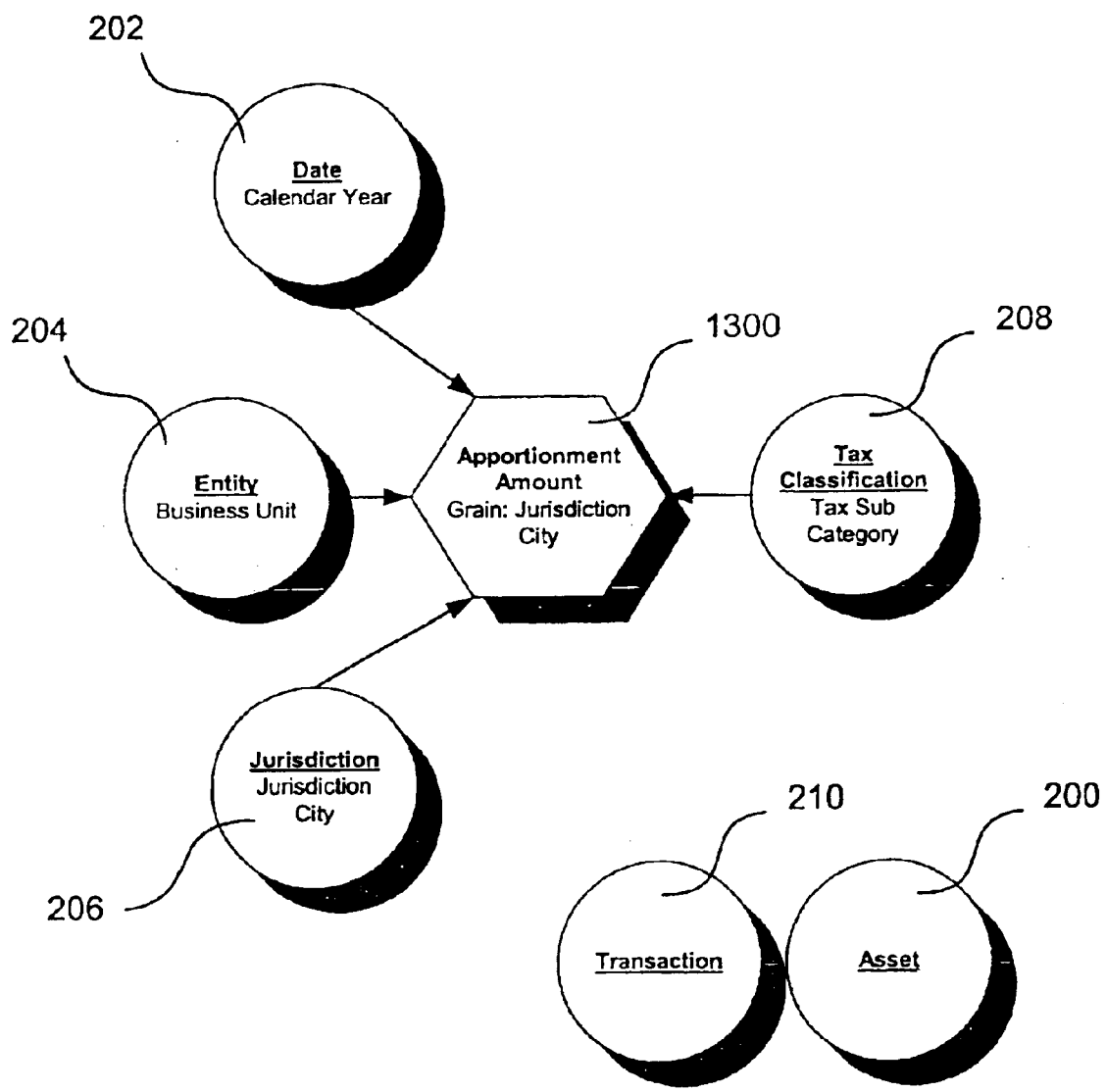
FIG. 13 is an illustration showing a set of the attributes associated with the apportionment fact in accordance with one embodiment of the present invention.

Examples of the tax apportionment facts 1300 and associated exemplary descriptions are shown in FIG. 13 and further characterized as follows:

| Fact Name | Fact Description | Default Aggregation Rule |
|---|---|---|
| Sales Percentage | Sales dollar amount by jurisdiction | Jurisdiction City |
| Property Percentage | Property dollar amount by jurisdiction | Jurisdiction City |
| Payroll Percentage | Payroll dollar amount by jurisdiction | Jurisdiction City |
| Apportionment Percentage | The result of the above three facts, weighted according to individual taxing jurisdiction parameters to determine overall tax rate applied on income tax return. | Jurisdiction City |

Figure 14:
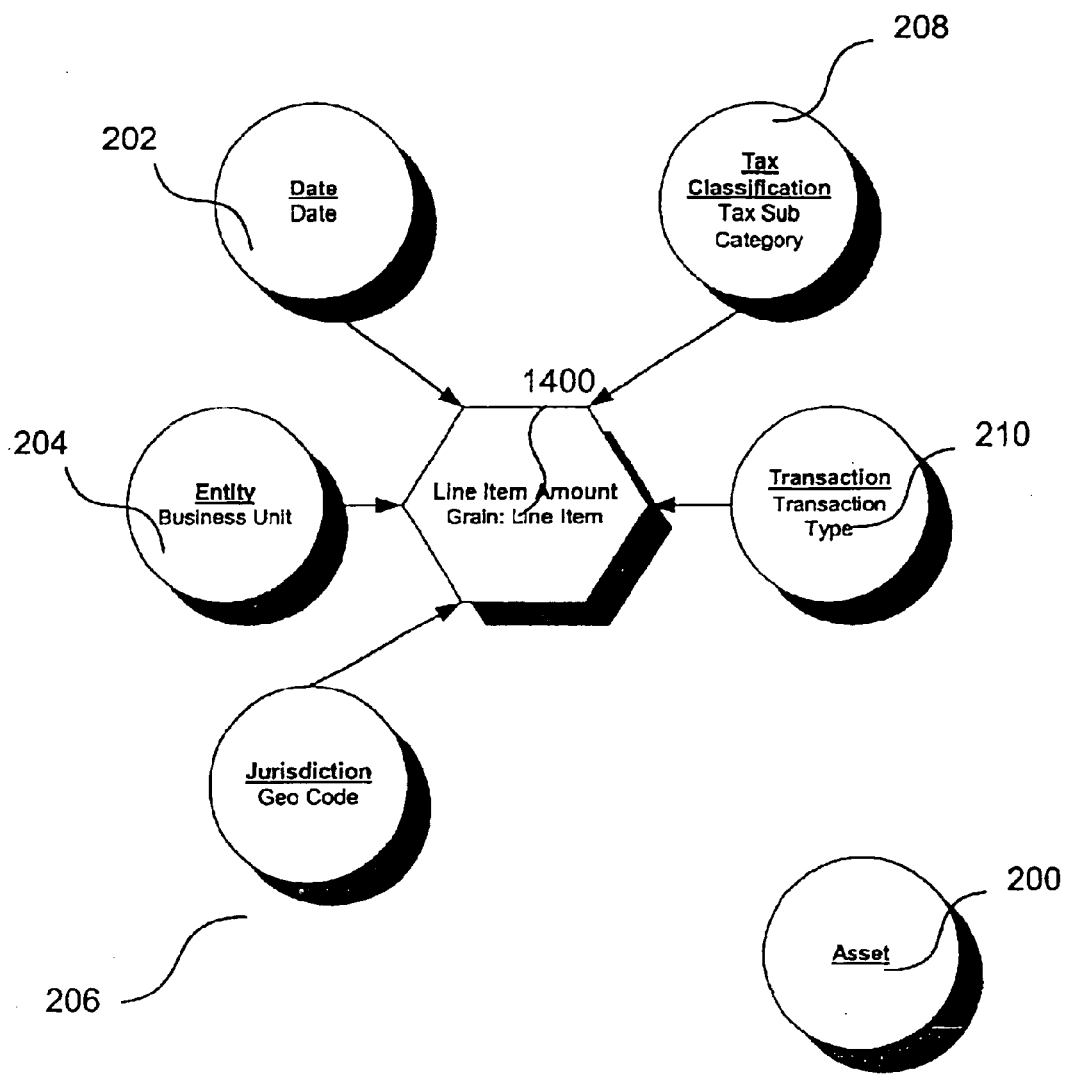
FIG. 14 is an illustration showing a set of the attributes associated with the line item fact in accordance with one embodiment of the present invention.

Examples of the line item facts 1400 and associated exemplary descriptions are shown in FIG. 14 and further characterized as follows:

| Fact Name | Fact Description | Default Aggregation Rule |
|---|---|---|
| Line Item Amount | The dollar amount at a level lower than the total transaction, such as the distribution to other GL accounts, freight/other costs, tax paid, etc. | |

Figure 15:
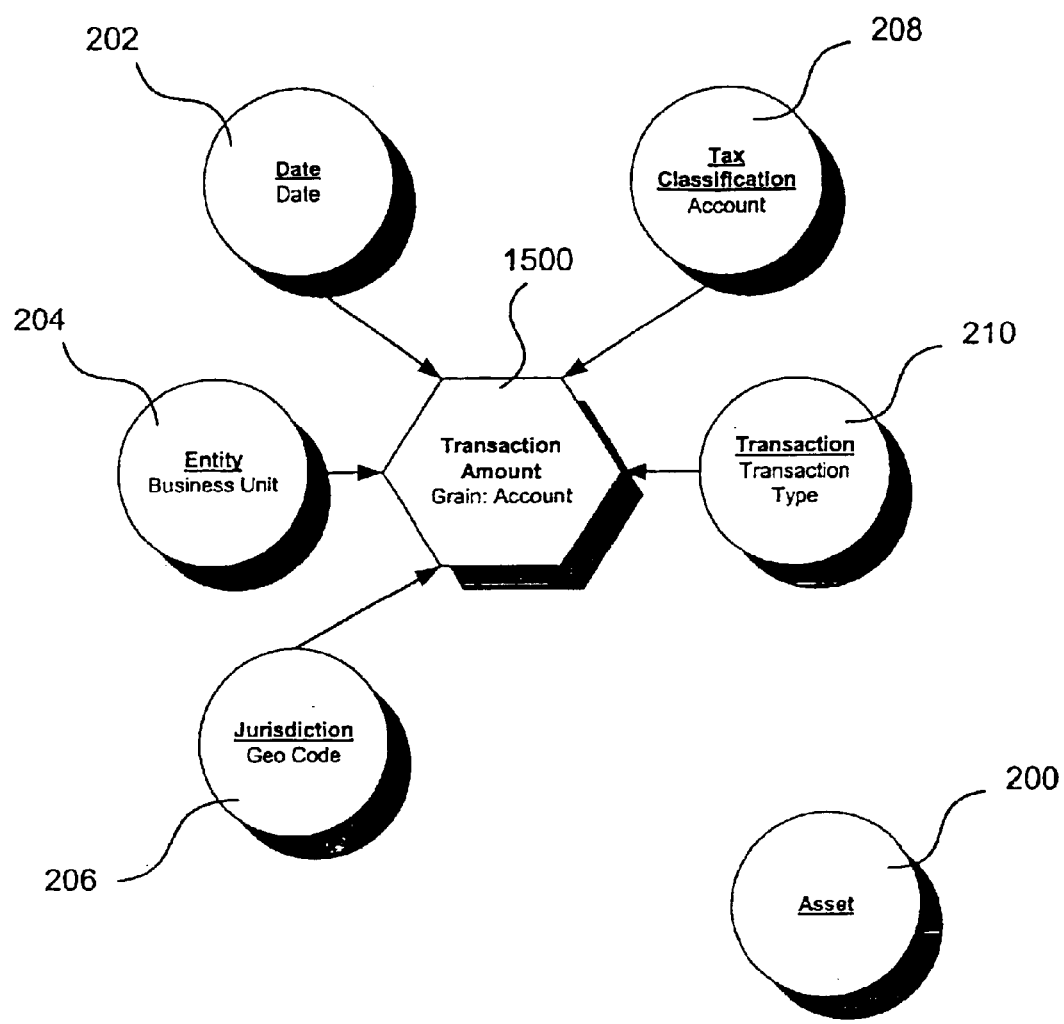
FIG. 15 is an illustration showing a set of the attributes associated with the transaction amount fact in accordance with one embodiment of the present invention.

Examples of the transaction facts 1500 and associated exemplary descriptions are shown in FIG. 15 and further characterized as follows:

| Fact Name | Fact Description | Default Aggregation Rule |
|---|---|---|
| Transaction Amount | The dollar amount per individual transaction document posting. This is an aggregate of line item. | Transactions will be stored at the account level. When transaction amounts are needed at the Transaction ID level, they will be derived from the Line Item Fact Table. |

Figure 16:
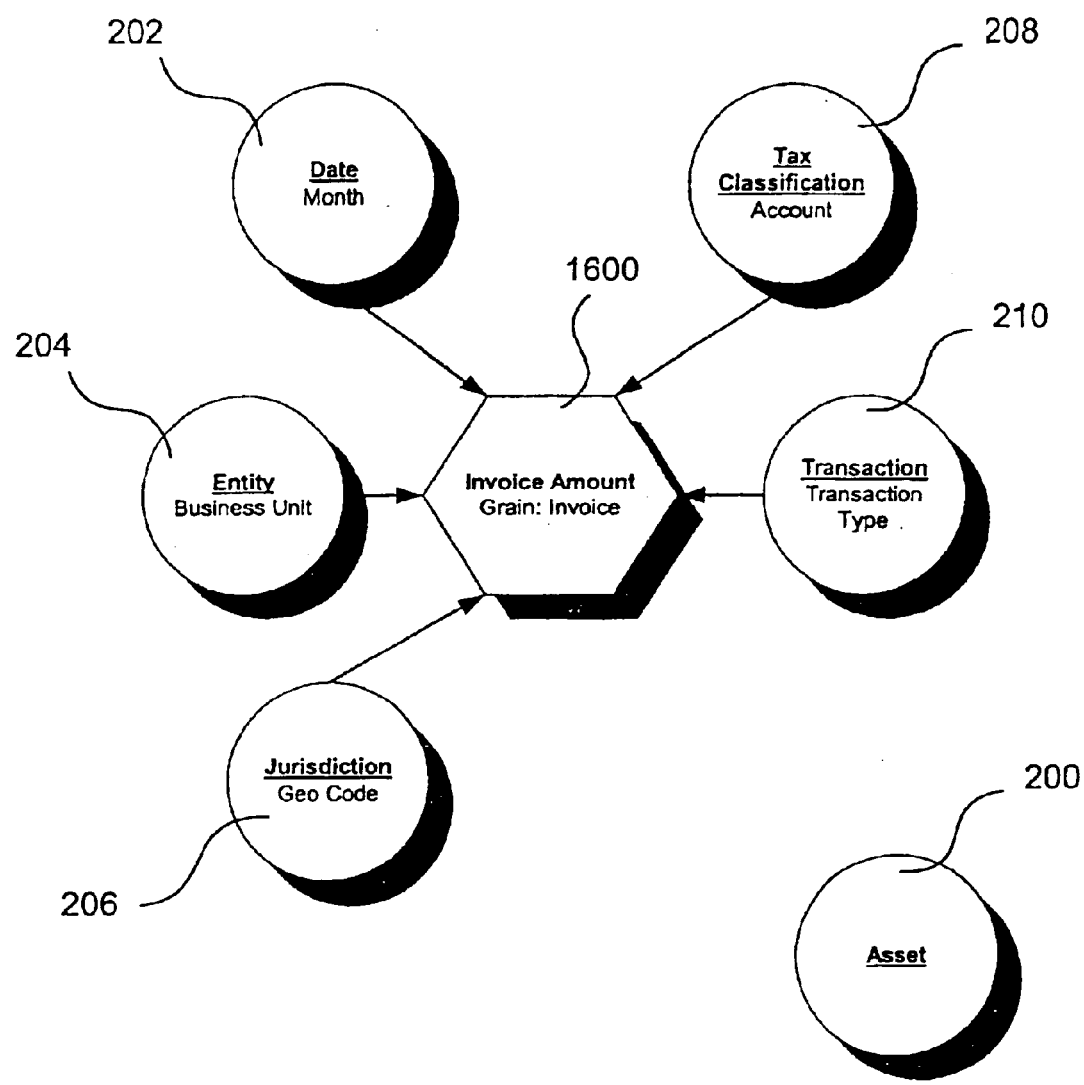
FIG. 16 is an illustration showing a set of the attributes associated with the invoice fact in accordance with one embodiment of the present invention.

Examples of the invoice facts 1600 and associated exemplary descriptions are shown in FIG. 16 and further characterized as follows:

| Fact Name | Fact Description | Default Aggregation Rule |
|---|---|---|
| Invoice Amount | Total dollar amount of all line items on the invoice. (*For detailed line item totals see the Line Item fact table with a "SUE Type" constraint within the Transaction dimension) | Summarized at the jurisdiction level |
| Pre Tax Invoice Amount | Dollar amount of line items on the invoice, before tax is paid or accrued | Summarized at the jurisdiction level |
| Exemption Amount | Dollar amount of line items on the invoice which are not taxable | Summarized at the jurisdiction level |
| Taxes Paid | Dollar amount of taxes paid on the invoice | Summarized at the jurisdiction level |
| Taxes Accrued | Dollar amount of taxes accrued on the invoice, to be paid at a later date | Summarized at the jurisdiction level |

Figure 17:
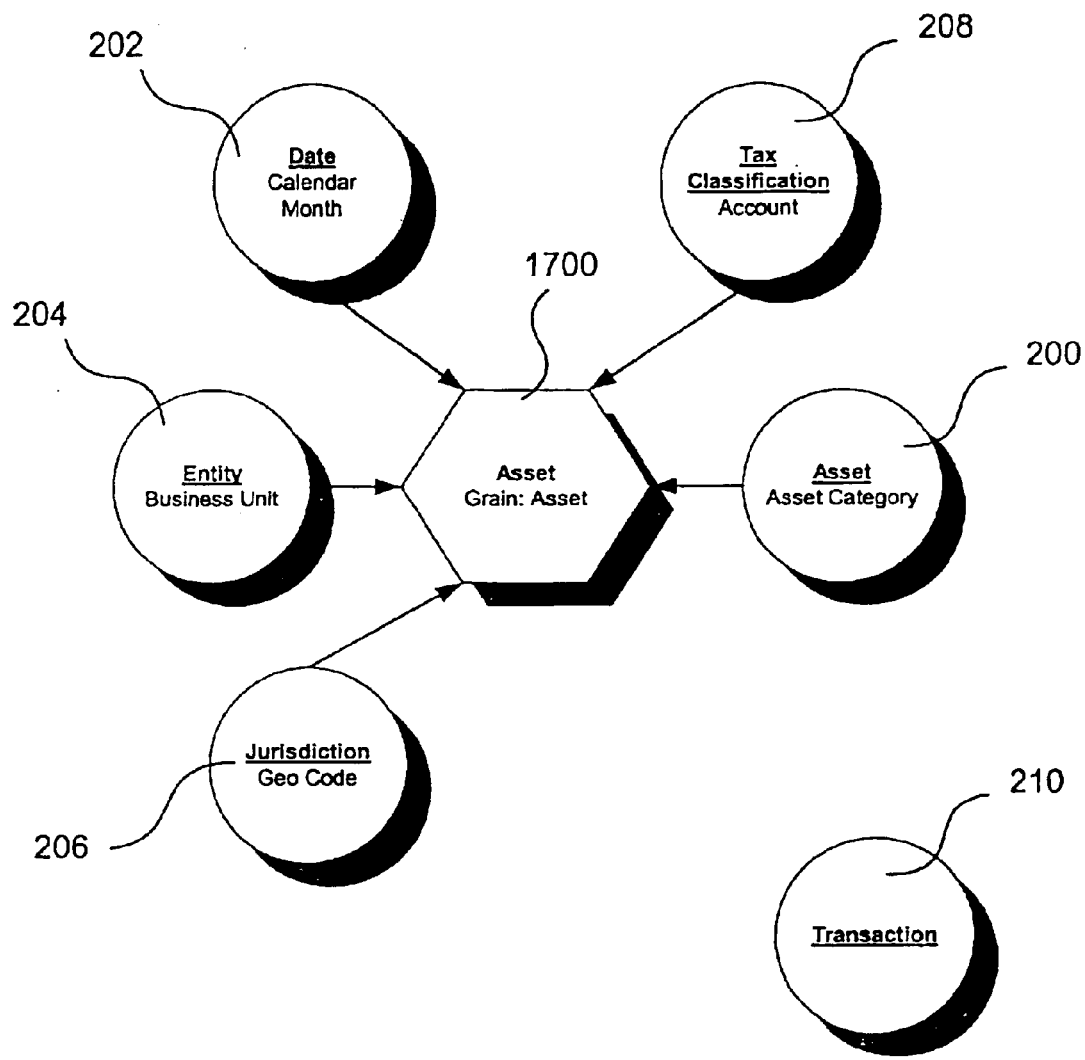
FIG. 17 is an illustration showing a set of the attributes associated with the asset fact in accordance with one embodiment of the present invention.

Examples of the asset facts 1700 and associated exemplary descriptions are shown in FIG. 17 and further characterized as follows:

| Fact Name | Fact Description | Default Aggregation Rule |
| --- | --- | --- |
| Book Basis | The dollar amount of the asset in accordance with GAAP | Summarized at the jurisdiction level |
| Accumulated Depreciation | The dollar amount of the book accumulated depreciation for financial purposes in accordance with GAAP | Summarized at the jurisdiction level |
| Assessed Value | Reflects the taxing authority's opinion of the current market value of the asset | Summarized at the jurisdiction level |
| Replacement Cost | The current cost to replace the asset | Summarized at the jurisdiction level |
| Utilization Number | Reflects the actual usage/production for an asset | Summarized at the jurisdiction level |
| Capacity Number | Reflects 100% usage/production for an asset | Summarized at the jurisdiction level |

Figure 18:
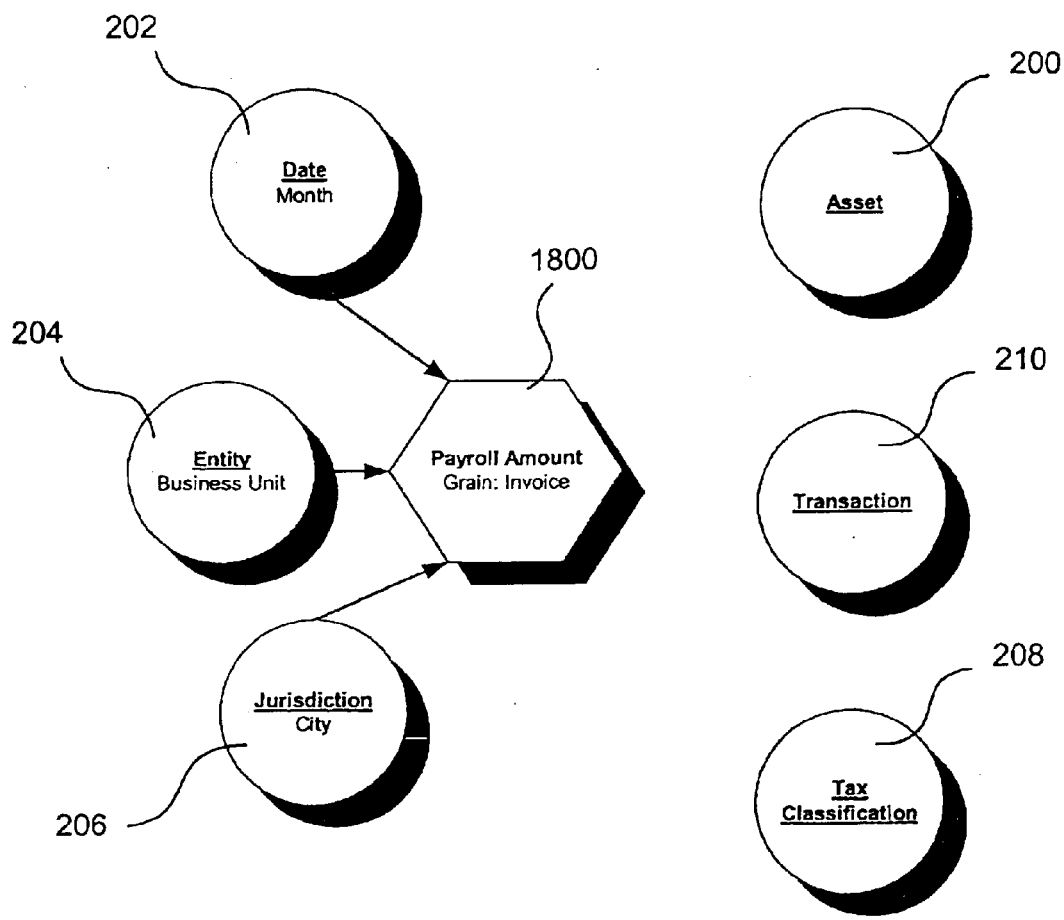
FIG. 18 is an illustration showing a set of the attributes associated with the payroll amount fact in accordance with one embodiment of the present invention.

Examples of the payroll facts 1800 and associated exemplary descriptions are shown in FIG. 18 and further characterized as follows:

| Fact Name | Fact Description | Default Aggregation Rule |
| --- | --- | --- |
| Payroll Amount | Total amount of salaries and wages paid in a jurisdiction | Summarized at the city jurisdiction level |
| Employee Headcount | The number of employees in a jurisdiction | Summarized at the city jurisdiction level |
| Employee Days | The number of days (attendance) | Summarized at the city jurisdiction level |
| Officer Salaries | The amount of salaries paid to officers of the business unit within a jurisdiction | Summarized at the city jurisdiction level |

Figure 19:
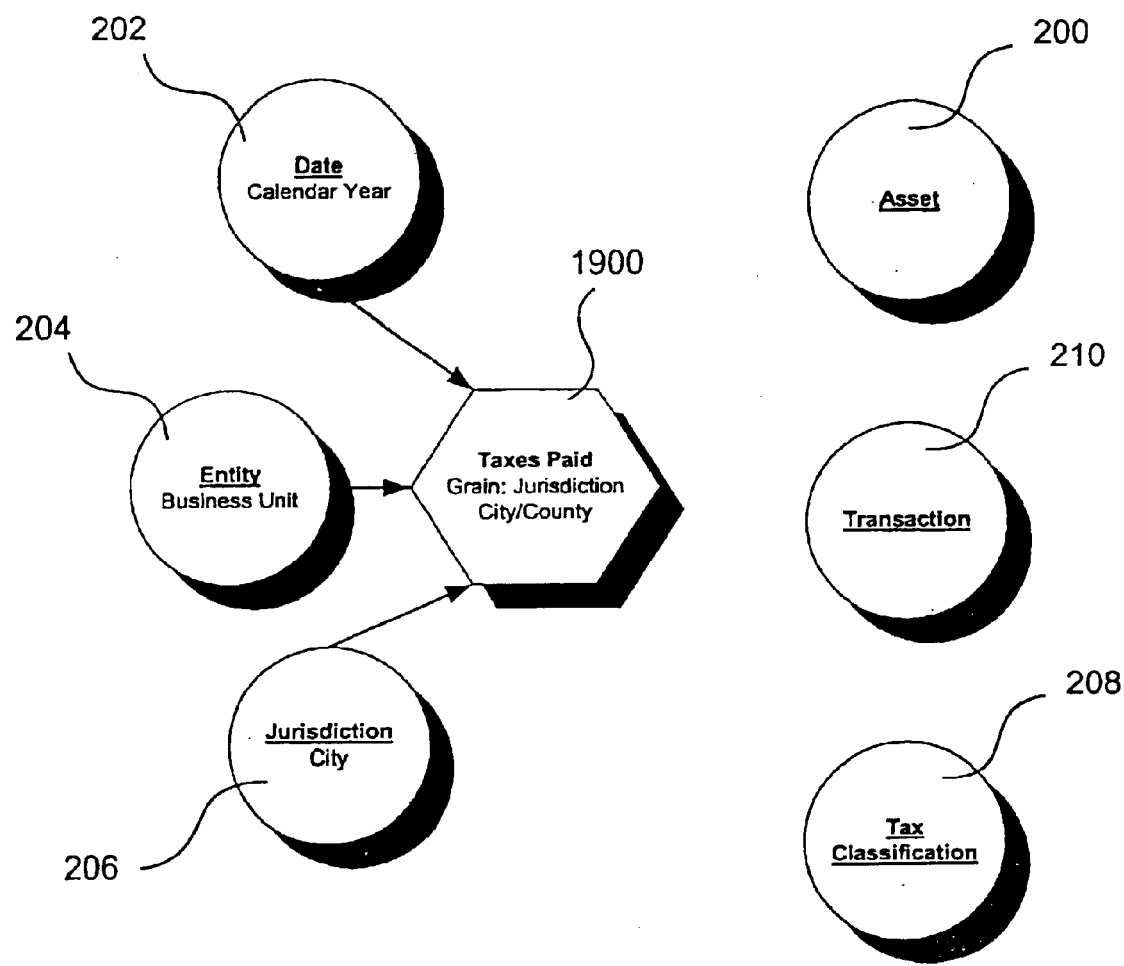
FIG. 19 is an illustration showing a set of the attributes associated with the taxes paid fact in accordance with one embodiment of the present invention.

Examples of the taxes paid facts 1900 and associated exemplary descriptions are shown in FIG. 19 and further characterized as follows:

| Fact Name | Fact Description | Default Aggregation Rule |
| --- | --- | --- |
| Sales Tax Amount | | Summarized at the city jurisdiction level |
| Use Tax Amount | | Summarized at the city jurisdiction level |
| Excise Tax Amount | | Summarized at the city jurisdiction level |
| Property Tax Amount | | Summarized at the city jurisdiction level |
| Income Tax Amount | | Summarized at the city jurisdiction level |
| Franchise Tax Amount | | Summarized at the city jurisdiction level |
| Other Tax Amount | | Summarized at the city jurisdiction level |

Figure 20:
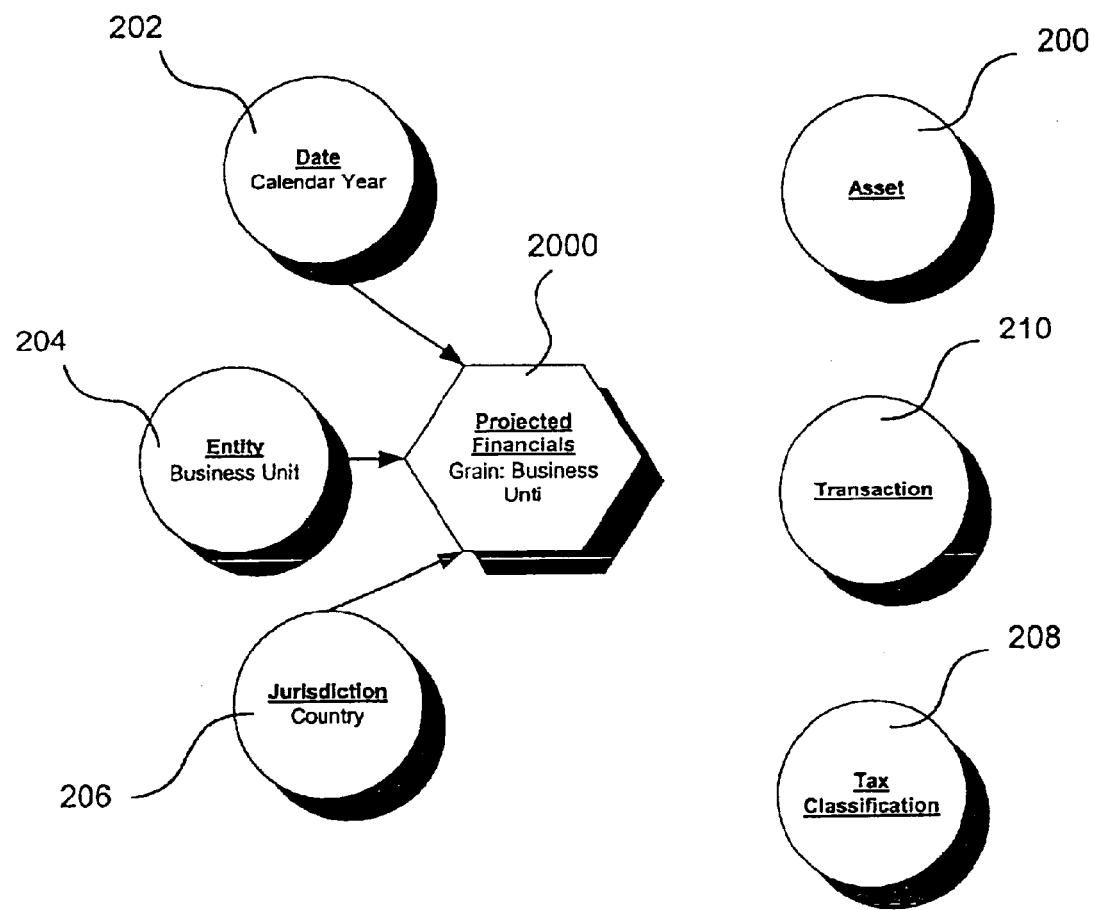
FIG. 20 is an illustration showing a set of the attributes associated with the projected financials fact in accordance with one embodiment of the present invention.

Examples of the projected financial facts 2000 and associated exemplary descriptions are shown in FIG. 20 and further characterized as follows:

| Fact Name | Fact Description | Default Aggregation Rule |
| --- | --- | --- |
| Projected Book Net Income Amount | Projected income less expenses for financial purposes | Summarized at the business unit level |
| Projected Permanent Differences | Projected items which are to be excluded for tax purposes (505 travel & entertainment, tax exempt interest income | Summarized at the business unit level |
| Projected Timing Differences | Projected items which need to be adjusted to reflect tax limitations, methods, etc. (excess contributions carryforwards, book vs. tax depreciation | Summarized at the business unit level |

The following are the various tiers of data within the Shared Dimensions that may be used in one implementation of the present invention. The hierarchical manner in which the data is prioritized or sorted is also illustrated.

```
Dimension:  Account
Levels:     Account ID
Dimension:  Asset
Levels:     Asset Category
                Asset ID
Dimension:  Date
Levels:     Year
                Quarter
                    Month
Dimension:  Entity
Levels:     Consolidated Group
                Company
                    Region
                        Division
                            Business Unit
Dimension:  Entity_Company
Levels:     Consolidated Group
                Company
Dimension:  Invoice Number
Levels:     PO Number
Dimension:  Jurisdiction_City
Levels:     Country
                State
                    City
Dimension:  Jurisdiction_Geo Code
Levels:     Country
                State
                    City
                        County
                            School District
                                Geo Code
Dimension:  Jurisdiction_Type
Levels:     Country
                Jurisdiction Type
                    Name
Dimension:  Tax_Account ID
Levels:     Tax Category
                Tax Subcategory
                    Account ID
                        Account Description
Dimension:  Tax_Subcategory
Levels:     Tax Category
                Tax Subcategory
Dimension:  Transaction_Description
Levels:     Transaction Description
Dimension:  Transaction FSC
```

-continued

| | | |
|---|---|---|
| Levels: | Ship To Geo Code | |
| | Customer Ac ID | |
| | Transaction ID | |
| | Line Item | |
| | Transaction Description | |
| Dimension: | Transaction ID | |
| Levels: | Transaction ID | |
| Dimension: | Transaction ID_Descp | |
| Levels: | Transaction ID | |
| | Transaction Description | |
| Dimension: | Transaction Type_ID_Descp | |
| Levels: | Transaction_Type | |
| | Transaction ID | |
| | Transaction Description | |
| Dimension: | Transaction_Line Item | |
| Levels: | Transaction Type | |
| | Tax Type | |
| | Line Item | |
| Dimension: | Customer ID | |
| Levels: | Customer Ac ID | |

OLAP Cubes

Cubes

The following sets illustrate various examples of dimensions and attributes necessary to determine exemplary facts.

Cube: Adjusted Book (See FIG. 9.)

Fact Table: adjusted_book_fact_tb1
Measure(s)
Adjusted Book Amount

| Dimension | Grain (attribute) |
|---|---|
| Date | month |
| Entity | business unit |
| Jurisdiction_Type | country |
| Tax_Subcategory | sub-category |

Cube: Apportionment Factor Comparison

Fact Table: apportionment_fact_tb1
Measure(s)
Apportionment Percent
Payroll Percent
Property Percent
Sales Percent

| Dimension | Grain |
|---|---|
| Date | year |
| Entity_Company | business unit |
| Jurisdiction_Geo Code | Geo Code |
| Tax_Account ID | Account (Description) |

Cube: FSC Transaction-by-Transaction Analysis

Fact Table: line_item_fact_tb1
Measure(s)
Line Item Amount

| Dimension | Grain |
|---|---|
| Date | month |
| Entity | business unit |
| Jurisdiction_Type | jurisdiction type |
| Tax_Subcategory | sub-category |
| Transaction_Line Item | line item |
| Transaction FSC | Transaction (Description) |

Cube: IDR Detail Transaction Analysis

Fact Table: line_item_fact_tb1
Measure(s)
Line Item Amount

| Dimension | Grain |
|---|---|
| Date | month |
| Entity | business unit |
| Jurisdiction_City | city |
| Tax_Account ID | account ID |
| Transaction_Tran ID | transaction ID |

Cube: Payroll

Fact Table: payroll_fact_tb1
Measure(s)
Payroll
Employee Headcount
Employee Days
Officer Salaries

| Dimension | Grain |
|---|---|
| Date | month |
| Entity | business unit |
| Jurisdiction_City | city |

Cube: Project Financial

Fact Table: projected_finanacial_fact_tb1
Measure(s)
Projected Book Net Income
Projected Permanent Differences
Projected Timing Differences

| Dimension | Grain |
|---|---|
| Date | month |
| Entity | business unit |
| Jurisdiction_City | city |

Cube: Project Taxable 1

Fact Table: projected_finanacial_fact_tb1
Measure(s)
Projected Book Net Income
Projected Permanent Differences
Projected Timing Differences

| Dimension | Grain |
|---|---|
| Date | month |
| Entity | business unit |
| Jurisdiction_City | city |

Cube: Project Taxable 2

Fact Table: schedule_m_fact_tb1
Measure(s)
Schedule M Amount

| Dimension | Grain |
|---|---|
| Date | month |
| Entity | business unit |
| Tax_Subcategory | tax subcategory |

Cube: Property Tax Comparison

Fact Table: asset_fact_tb1
Measure(s)
Accumulated Depreciation
Assessed Value
Book Basis
Capacity
Replacement Cost
Utilization

| Dimension | Grain |
|---|---|
| Asset | asset ID |
| Date | month |
| Entity | business unit |

-continued

| | |
|---|---|
| Jurisdiction_Geo Code | geo code |
| Tax_Account ID | account ID |

Cube: Purchase Transactions Analysis

Fact Table: invoice_fact_tb1
Measure(s)
Pretax Invoice
Taxes Paid
Invoice Total

| Dimension | Grain |
|---|---|
| Date | month |
| Entity_Company | Company |
| Jurisdiction_Geo Code | geo code |
| Account ID | account ID |
| Transaction ID_Decsp | Transaction Description |

Cube: Reserve Account Transaction Analysis

Fact Table: line_item_fact_tb1
Measure(s)
Line Item Amount

| Dimension | Grain |
|---|---|
| Date | month |
| Entity | business unit |
| Jurisdiction_City | city |
| Tax_Account ID | account ID |
| Transaction Description | Transaction Description |
| Transaction ID | Transaction ID |
| Transaction Type | Transaction Type |

Cube: Sales Tax Refund

Fact Table: invoice_fact_tb1
Measure(s)
Invoice Total
Pre-tax Invoice Amount
Exempt Amount
Tax Paid
Tax Accrued

| Dimension | Grain |
|---|---|
| Date | month |
| Entity | business unit |
| Tax_Subcategory | tax subcategory |
| Vendor ID | vendor ID |
| Invoice Number | Invoice Number |

Cube: Sales Tax Refund Analysis

Fact Table: invoice_fact_tb1
Measure(s)
Exempt Base Amount
Invoice Amount
Pre-tax Invoice Amount
Tax Accrued
Tax Paid

| Dimension | Grain |
|---|---|
| Date | month |
| Entity | business unit |
| Tax_Account ID | account ID |

Cube: Schedule M Comparison

Fact Table: schedule_m_fact_tb1
Measure(s)
Schedule M Amount

| Dimension | Grain |
|---|---|
| Date | year |
| Entity | business unit |

-continued

| | |
|---|---|
| Tax_Sub Category | sub-category |

Cube: Tax Adjustment

Fact Table: tax_adjustment_fact_tb1
Measure(s)
Tax Adjustment Amount

| Dimension | Grain |
|---|---|
| Date | year |
| Entity | business unit |
| Jurisdiction_Type | jurisdiction name |
| Tax_Sub Category | sub-category |

Cube: Tax Return Analysis

Fact Table: tax_return_fact_tb1
Measure(s)
Tax Return Amount

| Dimension | Grain |
|---|---|
| Date | year |
| Entity | business unit |
| Jurisdiction_Type | jurisdiction type |
| Tax_Sub Category | sub-category |

Cube: Three Year Schedule M Comparison

Fact Table: schedule_m_fact_table
Measure(s)
Schedule M Amount

| Dimension | Grain |
|---|---|
| Date | year |
| Entity | business unit |
| Tax_Account ID | Account ID (Description) |

Cube: Virtual Reserve Account Tax Class

Fact Table: line_item_fact_tb1
Measure(s)
Line Item Amount

| Dimension | Grain |
|---|---|
| Tax_Account ID | Account ID (Description) |

Virtual Cubes
Cube: Book to Tax Reconciliation

Fact Tables: tax_return_fact_tb1, schedule_m_fact_tb1, adjusted_book_fact_tb1
Measure(s)
tax_return_fact_tb1.Tax Return Amount
schedule_m_fact_tb1.Schedule M Amount
adjusted_book_fact_tb1.Adjusted Book Amount
tax adjustment.Tax Adjustment Amount

| Dimension | Grain |
|---|---|
| Date | month |
| Entity | business unit |
| Jurisdiction_Type | jurisdiction type |
| Tax_Sub Category | sub-category |

Cube: Projected Taxable Income

Fact Tables: projected_finanacial_fact_tb1, schedule_m_fact_tb1
Measure(s)
Projected taxable income 1.Projected Book Net Income
Projected taxable income 1.Projected Permanent Differences
Projected taxable income 1.Projected Timing Difference
Projected taxable income 2.Schedule M Amount

| Dimension | Grain |
| --- | --- |
| Date | month |
| Entity | business unit |
| Jurisdiction_City | jurisdiction type |
| Tax_Sub Category | sub-category |

Cube: Projected Taxable Income (FIX)

Fact Tables: Reserve Account Transaction Analysis
Measure(s)
Reserve Account Transaction Analysis Line Item Amount

| Dimension | Grain |
| --- | --- |
| Date | month |
| Entity | business unit |
| Jurisdiction_City | jurisdiction type |
| Tax_Account ID | Account ID (Description) |

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for organizing and managing a transaction-related dimension of tax data for generating fact details comprising the steps of:
   (a) providing a transaction-related dimension of tax data;
   (b) providing a plurality of attributes categories for the transaction-related dimension of tax data, an attributes including a transaction line item determined based on attributes selected from attributes categories consisting of a transaction identifier, a transaction type, a tax type, a customer account identifier, a sold to location geographic code, a ship to location geographic code, a contract number, a purchase order number, a vendor account identifier, and a vendor zip code;
   (c) receiving a plurality of transaction data for which tax data must be captured and reported;
   (d) capturing specific attribute information from the plurality of received transaction data as specific fact details; and
   (e) calculating and collating a plurality of aggregate fact details from the captured specific fact details.

2. The method as set forth in claim 1, and further comprising the step of:
   providing a description link of each of the attributes categories.

3. The method as set forth in claim 1, wherein the transaction line item is further determined based on attributes selected from the group consisting of a transaction description and a contract type.

4. The method as set forth in claim 1, and further comprising the step of:
   providing a description link of each of the fact details.

5. The method as set forth in claim 1, wherein the transaction line item is determined based on attributes including a transaction identifier, a transaction type, a tax type, a customer account identifier, a sold to location geographic code, a ship to location geographic code, a contract number, a purchase order number, a vendor account identifier, and a vendor zip code.

6. The method as set forth in claim 1, wherein the fact details are selected from the group of fact details consisting of an adjusted book fact, a tax adjustment fact, a schedule M fact, a tax return fact, an apportionment fact, a line item fact, a transaction fact, an invoice fact, an asset fact, a payroll fact, a taxes paid fact, and a projected financial fact.

7. A computer program embodied on a computer readable medium for organizing and managing a transaction-related dimension of tax data for generating fact details comprising:
   (a) a code segment that provides a transaction-related dimension of tax data;
   (b) a code segment that provides a plurality of attributes categories for the transaction-related dimension of tax data, an attributes including a transaction line item determined based on attributes selected from attributes categories consisting of a transaction identifier, a transaction type, a tax type, a customer account identifier, a sold to location geographic code, a ship to location geographic code, a contract number, a purchase order number, a vendor account identifier, and a vendor zip code;
   (c) a code segment for receiving a plurality of transaction data for which tax data must be captured and reported;
   (d) a code segment for capturing specific attribute information from the plurality of received transaction data as specific fact details; and
   (e) a code segment for calculating and collating a plurality of aggregate fact details from the captured specific fact details.

8. The computer program as set forth in claim 7, and further comprising a code segment that provides a description link of each of the attributes categories.

9. The computer program as set forth in claim 7, wherein the transaction line item is further determined based on attributes selected from the group consisting of a transaction description and a contract type.

10. The computer program as set forth in claim 7, and further comprising a code segment that provides a description link of each of the fact details.

11. The computer program as set forth in claim 7, wherein the transaction line item is determined based on attributes including a transaction identifier, a transaction type, a tax type, a customer account identifier, a sold to location geographic code, a ship to location geographic code, a contract number, a purchase order number, a vendor account identifier, and a vendor zip code.

12. The computer program as set forth in claim 7, wherein the fact details are selected from the group of fact details consisting of an adjusted book fact, a tax adjustment fact, a schedule M fact, a tax return fact, an apportionment fact, a line item fact, a transaction fact, an invoice fact, an asset fact, a payroll fact, a taxes paid fact, and a projected financial fact.

13. A system for organizing and managing a transaction-related dimension of tax data for generating fact details comprising:
   (a) logic that provides a transaction-related dimension of tax data;
   (b) logic that provides a plurality of attributes categories for the transaction-related dimension of tax data, an attributes including a transaction line item determined based on attributes selected from attributes categories consisting of a transaction identifier, a transaction type, a tax type, a customer account identifier, a sold to location geographic code, a ship to location geographic code, a contract number, a purchase order number, a vendor account identifier, and a vendor zip code;

(c) logic that receives a plurality of transaction data for which tax data must be captured and reported;

(d) logic that captures specific attribute information from the plurality of received transaction data as specific fact details; and (e) logic that calculates and collates a plurality of aggregate fact details from the captured specific fact details.

14. The system as set forth in claim 13, and further comprising logic that provides a description link of each of the attributes categories.

15. The system as set forth in claim 13, wherein the transaction line item is further determined based on attributes selected from the group consisting of a transaction description and a contract type.

16. The system as set forth in claim 13, and further comprising logic that provides a description link of each of the fact details.

17. The system as set forth in claim 13, wherein the transaction line item is determined based on attributes including a transaction identifier, a transaction type, a tax type, a customer account identifier, a sold to location geographic code, a ship to location geographic code, a contract number, a purchase order number, a vendor account identifier, and a vendor zip code.

18. The system as set forth in claim 13, wherein the fact details are selected from the group of fact details consisting of an adjusted book fact, a tax adjustment fact, a schedule M fact, a tax return fact, an apportionment fact, a line item fact, a transaction fact, an invoice fact, an asset fact, a payroll fact, a taxes paid fact, and a projected financial fact.

* * * * *